US012136894B2

(12) United States Patent
Nishibata et al.

(10) Patent No.: US 12,136,894 B2
(45) Date of Patent: Nov. 5, 2024

(54) POWER CONVERTER CONTROL CIRCUIT

(71) Applicant: DENSO CORPORATION, Kariya (JP)

(72) Inventors: Kouichi Nishibata, Kariya (JP);
Akifumi Araragi, Kariya (JP);
Masanori Yamamura, Kariya (JP)

(73) Assignee: DENSO CORPORATION, Kariya (JP)

( * ) Notice: Subject to any disclaimer, the term of this patent is extended or adjusted under 35 U.S.C. 154(b) by 157 days.

(21) Appl. No.: 17/888,095

(22) Filed: Aug. 15, 2022

(65) Prior Publication Data

US 2022/0393633 A1     Dec. 8, 2022

Related U.S. Application Data

(63) Continuation of application No. PCT/JP2021/003042, filed on Jan. 28, 2021.

(30) Foreign Application Priority Data

Feb. 13, 2020   (JP) .................................. 2020-022528

(51) Int. Cl.
*H02P 29/024* (2016.01)
*H02M 1/08* (2006.01)
(Continued)

(52) U.S. Cl.
CPC .......... *H02P 29/0241* (2016.02); *H02M 1/08* (2013.01); *H02M 1/32* (2013.01); *H02M 7/53871* (2013.01); *H02P 27/06* (2013.01)

(58) Field of Classification Search
CPC ...... H02P 29/0241; H02P 27/06; H02M 1/08; H02M 1/32; H02M 7/53871
See application file for complete search history.

(56) References Cited

U.S. PATENT DOCUMENTS

2006/0181239 A1*  8/2006  Galli ....................... D06F 34/10
                                                            318/805
2008/0304189 A1* 12/2008  Tang .................... H02H 7/1222
                                                            318/434
(Continued)

FOREIGN PATENT DOCUMENTS

CA        2740979 A1 *  4/2010  .............. B60L 1/003
JP     2012-253837 A    12/2012
(Continued)

*Primary Examiner* — Bickey Dhakal
(74) *Attorney, Agent, or Firm* — Oliff PLC

(57) ABSTRACT

A control circuit is used for a system including a power storage unit, an electric load, and a power converter electrically connected to the electric load. The control circuit includes an abnormality determination unit, an emergency power supply that generates power based on electricity supplied from the power storage unit, and a protective control unit that, when the abnormality determination unit determines that an abnormality has occurred, performs protective control for the system. The emergency power supply includes a power supply control unit configured to be operable based on electricity supplied from the power storage unit. During the period from when the voltage input to the power supply control unit starts increasing based on electricity supplied from the power storage unit, the power supply control unit starts the emergency power supply in response to the input voltage reaching a specified voltage.

7 Claims, 17 Drawing Sheets

(51) Int. Cl.
*H02M 1/32* (2007.01)
*H02M 7/5387* (2007.01)
*H02P 27/06* (2006.01)

(56) References Cited

U.S. PATENT DOCUMENTS

2009/0295224 A1* 12/2009 Kobayashi .............. B60L 50/40
                                                                              307/9.1
2013/0033908 A1    2/2013 Schwarz et al.
2016/0226410 A1* 8/2016 Lopez De Arroyabe ....................
                                                                          B60L 7/003
2017/0302215 A1* 10/2017 Jing .................... H02P 29/0241

FOREIGN PATENT DOCUMENTS

JP          6162445 B2    7/2017
JP      2020150713 A * 9/2020

* cited by examiner

POWER CONVERTER CONTROL CIRCUIT

CROSS-REFERENCE TO RELATED APPLICATION

This application is the U.S. bypass application of International Application No. PCT/JP2021/003042 filed on Jan. 28, 2021 which designated the U.S. and claims priority to Japanese Patent Application No. 2020-022528, filed on Feb. 13, 2020, the contents of both of which are incorporated herein by reference.

TECHNICAL FIELD

The present disclosure relates to a power converter control circuit.

BACKGROUND

A known example of control circuits of a power converter is a control circuit for a system including a power source, a multiphase rotating electric machine, and a power converter that includes switches for upper and lower arms electrically connected to the winding in each phase of the rotating electric machine. Such known examples also include a control circuit that performs shutdown control to forcibly turn off the switches for the upper and lower arms in response to determination that an abnormality has occurred in the system. In shutdown control, the rotation of the rotor included in the rotating electric machine may generate a back electromotive force in the winding, and the line voltage across the winding may be higher than the voltage of the power source parallelly connected to the series-connection body of the switches for the upper and lower arms. The line voltage may be high when, for example, the magnetic flux of the field magnet in the rotor is high or the rotational speed of the rotor is high.

SUMMARY

An aspect of the present disclosure provides a power converter control circuit for a system including a power storage unit, an electric load, and a power converter electrically connected to the electric load. The power converter control circuit includes an abnormality determination unit configured to determine whether an abnormality has occurred in the system, an emergency power supply configured to generate power based on electricity supplied from the power storage unit, and a protective control unit configured to, in response to the abnormality determination unit determining that an abnormality has occurred, perform protective control for the system by using the power generated by the emergency power supply. The emergency power supply includes a power supply control unit being a control unit for controlling the emergency power supply and configured to be operable based on electricity supplied from the power storage unit, and during a period from when an input voltage to the power supply control unit starts increasing based on electricity supplied from the power storage unit to when the input voltage reaches a voltage of the power storage unit, the power supply control unit starts the emergency power supply in response to the input voltage reaching a specified voltage.

BRIEF DESCRIPTION OF THE DRAWINGS

The above features of the present disclosure will be made clearer by the following detailed description, given referring to the appended drawings. In the accompanying drawings.

DETAILED DESCRIPTION OF THE PREFERRED EMBODIMENTS

Figure 1:
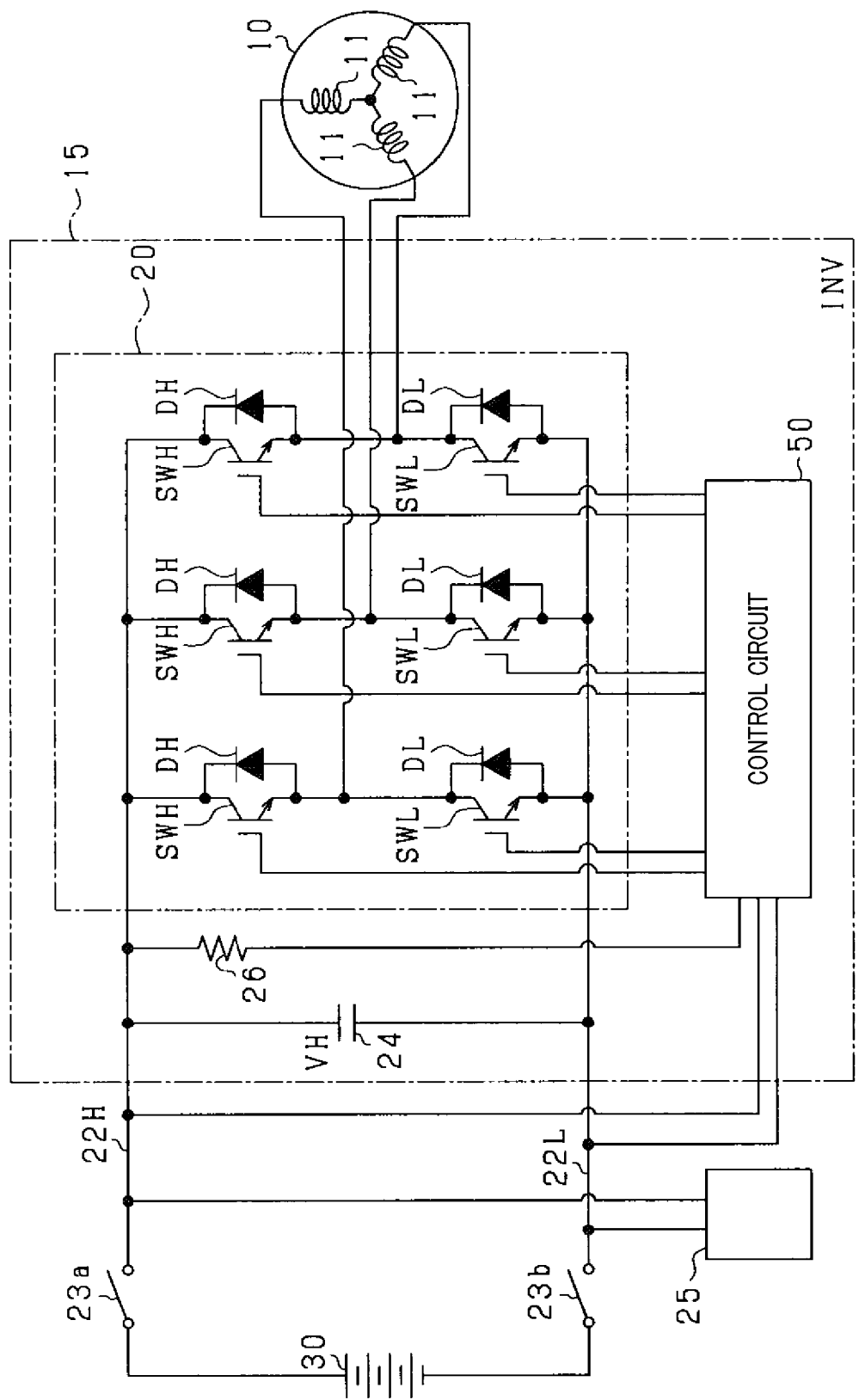
FIG. 1 is a diagram illustrating the overall configuration of a control system according to a first embodiment.

When the line voltage across the winding is higher than the voltage of the power source, even if shutdown control is in effect, an induced current is generated in the winding and flows as regenerated power in a closed circuit including the winding, the power source, and the diode connected in antiparallel with the switches. This may greatly increase the DC voltage at the side of the power converter adjacent to the power source, causing a breakdown in at least one of the power source, the power converter, and the devices connected to the power source other than the power converter.

To address the issue, as described in JP T 2013-506390 A, a known control circuit performs short circuit control that brings the switch for one of the upper and lower arms into an on state and the switch for the other arm into an off state. Specifically, the control circuit includes an emergency power supply for generating power based on electricity supplied from a power source, and uses the power generated by the emergency power supply to perform short circuit control.

When an abnormality occurs in the system, the control circuit may not be supplied with enough power for short circuit control from the emergency power supply. In such a case, the control circuit may take a longer time after the abnormal occurrence in the system to perform the short circuit control, causing a failure to protect the system.

This concern is not limited to short circuit control. Any control circuit that performs protective control for a system using power generated by an emergency power supply may similarly face the problem of taking a longer time after the occurrence of an abnormality in the system to perform the protective control. This problem may arise not only in a system including a rotating electric machine electrically connected to a power converter but also in a system including an electric load electrically connected to a power converter.

A main objective of the present disclosure is to provide a power converter control circuit capable of shortening the time taken after the occurrence of an abnormality in the system to perform protective control.

An aspect of the present disclosure provides a power converter control circuit for a system including a power storage unit, an electric load, and a power converter electrically connected to the electric load. The power converter control circuit includes an abnormality determination unit configured to determine whether an abnormality has occurred in the system, an emergency power supply configured to generate power based on electricity supplied from the power storage unit, and a protective control unit configured to, in response to the abnormality determination unit determining that an abnormality has occurred, perform protective control for the system by using the power generated by the emergency power supply. The emergency power supply includes a power supply control unit being a control unit for controlling the emergency power supply and configured to be operable based on electricity supplied from the power storage unit, and during a period from when an input voltage to the power supply control unit starts increasing based on electricity supplied from the power storage unit to when the input voltage reaches a voltage of the power storage unit, the power supply control unit starts the emergency power supply in response to the input voltage reaching a specified voltage.

The power supply control unit according to the present disclosure is configured to be operable based on electricity supplied from the power storage unit and controls the emergency power supply. During the period from when the voltage input to the power supply control unit starts increasing based on electricity supplied from the power storage unit to when the input voltage reaches the voltage of the power storage unit, the power supply control unit starts up the emergency power supply when the input voltage reaches the specified voltage. This starting allows the emergency power supply to be ready to output electric power, and the protective control unit can ensure electric power for protective control on the system from the emergency power supply. This enables the protective control unit to perform protective control rapidly in response to later determination by the abnormality determination unit that an abnormality has occurred in the system. The power converter control circuit according to the present disclosure described above can shorten the time taken after the occurrence of an abnormality in the system to perform protective control. This enables safer protection of the power converter and equipment connected to the power converter.

First Embodiment

A first embodiment of a control circuit according to the present disclosure will now be described with reference to the drawings. The control circuit according to the present embodiment is used for a three-phase inverter serving as a power converter. In the present embodiment, a control system including an inverter is installed in a vehicle such as an electric vehicle or a hybrid vehicle.

As shown in FIG. 1, the control system includes a rotating electric machine 10 and an inverter 15. The rotating electric machine 10 is a vehicle main motor, and its rotor is capable of transmitting power to drive wheels (not shown). The rotating electric machine 10 used in the present embodiment is a synchronous motor, or more specifically, a permanent-magnet synchronous motor.

The inverter 15 includes a switching device unit 20. The switching device unit 20 includes series-connection bodies for three phases each having an upper arm switch SWH and a lower arm switch SWL. In each phase, the connection point between the upper and lower arm switches SWH, SWL is connected to a first end of a winding 11 in the rotating electric machine 10. The winding 11 in each phase has a second end connected to a neutral point. The windings 11 in the phases are displaced from each other by 120° electrical degrees. In the present embodiment, each switch SWH, SWL is a voltage-controlled semiconductor switching element, or more specifically, an IGBT. The upper and lower arm switches SWH, SWL are connected in antiparallel with upper and lower arm diodes DH, DL that are freewheel diodes.

The higher potential terminal of each upper arm switch SWH, or the collector, is connected to the positive electrode terminal of a high voltage power source 30 via a high potential electrical channel 22H. The lower potential terminal of each lower arm switch SWL, or the emitter, is connected to the negative electrode terminal of the high voltage power source 30 via a low potential electrical channel 22L. In the present embodiment, the high voltage power source 30 is a secondary battery, and its output voltage (rated voltage) is, for example, 100 V or more.

The high potential electrical channel 22H is provided with a first shutoff switch 23a, and the low potential electrical channel 22L is provided with a second shutoff switch 23b. Each switch 23a, 23b is, for example, a relay or a semiconductor switching element. Each switch 23a, 23b may be driven by a control circuit 50 or an upper ECU (not shown). The upper ECU is an upper controller relative to the control circuit 50.

The inverter 15 includes a smoothing capacitor 24 as a power storage unit. The smoothing capacitor 24 electrically connects the part of the high potential electrical channel 22H extending from the first shutoff switch 23a toward the switching device unit 20 and the part of the low potential electrical channel 22L extending from the second shutoff switch 23b toward the switching device unit 20.

The control system includes an on-vehicle electrical device 25. The electrical device 25 includes, for example, at least one of an electric compressor and a DC-DC converter. The electric compressor is included in the air conditioner in the vehicle and driven based on electricity supplied from the high voltage power source 30 in order to circulate the coolant for the vehicle refrigeration cycle. The DC-DC converter lowers and supplies the output voltage of the high voltage power source 30 to an on-vehicle low voltage load. The low voltage load includes a low voltage power source 31 shown in FIG. 2. In the present embodiment, the low voltage power source 31 is a secondary battery such as a lead-acid battery having an output voltage (rated voltage) that is a voltage (e.g., 12 V) lower than the output voltage of the high voltage power source 30 (rated voltage).

Figure 4:
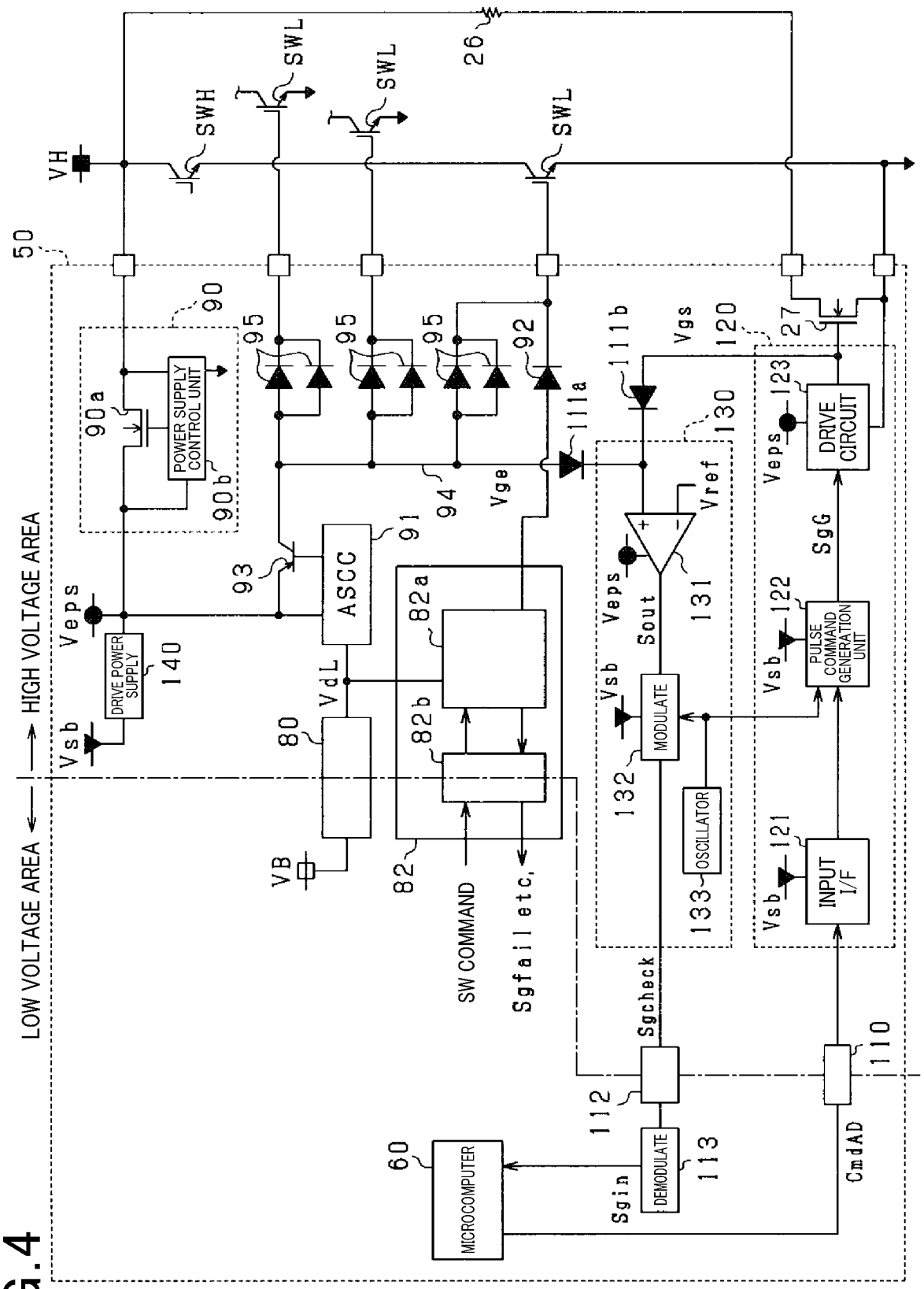
FIG. 4 is a diagram illustrating the control circuit and its surroundings.

The inverter 15 includes a discharge resistor 26 and a discharge switch 27 shown in FIG. 4. The discharge resistor 26 and the discharge switch 27 are connected in series. This series-connection body electrically connects the part of the high potential electrical channel 22H extending from the first shutoff switch 23*a* toward the switching device unit 20 and the part of the low potential electrical channel 22L extending from the second shutoff switch 23*b* toward the switching device unit 20. Specifically, the higher potential terminal of the discharge switch 27, or the drain, is connected to one end of the discharge resistor 26, and the lower potential terminal of the discharge switch 27, or the source, is connected to the low potential electrical channel 22L. The discharge switch 27 is driven in response to an instruction from the control circuit 50 included in the inverter 15.

Figure 2:
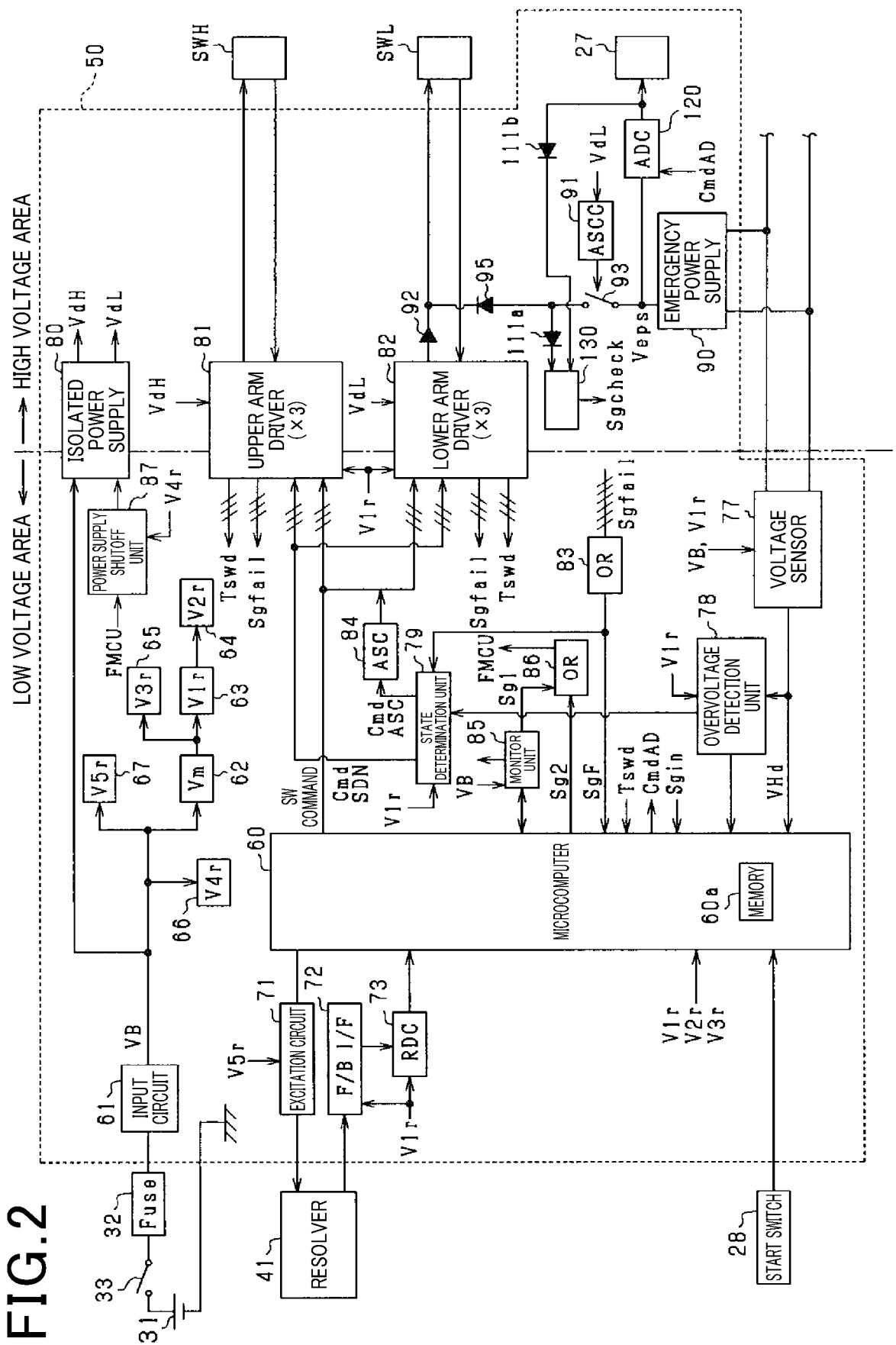
FIG. 2 is a diagram illustrating a control circuit and its surroundings.

Referring next to FIG. 2, the configuration of the control circuit 50 will now be described. The control circuit 50 includes an input circuit 61, an intermediate power supply circuit 62, and first to fifth low voltage power supply circuits 63 to 67. The input circuit 61 is connected to the positive electrode terminal of the low voltage power source 31 via a fuse 32 and a power switch 33. The negative electrode terminal of the low voltage power source 31 is connected to a ground serving as a connection to ground.

The control system includes an angle sensor 41. The angle sensor 41 outputs an angle signal corresponding to the electrical angle of the rotating electric machine 10. The angle sensor 41 is, for example, a resolver, an encoder, or an MR sensor including a magnetoresistance element. In the present embodiment, the angle sensor 41 is a resolver.

The intermediate power supply circuit 62 lowers an output voltage VB from the input circuit 61 to generate an intermediate voltage Vm (e.g., 6 V). The first low voltage power supply circuit 63 lowers the output voltage Vm from the intermediate power supply circuit 62 to generate a first voltage V1$r$ (e.g., 5 V). The second low voltage power supply circuit 64 lowers the first voltage V1$r$ output from the first low voltage power supply circuit 63 to generate a second voltage V2$r$ (e.g., 3.3 V). The third low voltage power supply circuit 65 lowers the first voltage V1$r$ output from the first low voltage power supply circuit 63 to generate a third voltage V3$r$. In the present embodiment, the third voltage V3$r$ is a voltage lower than the second voltage V2$r$ (e.g., 1.2 V).

The fourth low voltage power supply circuit 66 lowers the output voltage VB from the input circuit 61 to generate a fourth voltage V4$r$ (e.g., 5 V). In the present embodiment, the fourth voltage V4$r$ is the same value as the first voltage V1$r$. The fifth low voltage power supply circuit 67 raises the output voltage VB from the input circuit 61 to generate a fifth voltage V5$r$ (e.g., 30 V). The input circuit 61, the power supply circuits 62 to 67, and a microcomputer 60 are placed in a low voltage area in the control circuit 50.

The control circuit 50 includes an excitation circuit 71, an FB interface unit 72, and a resolver-digital converter 73. The excitation circuit 71 is configured to be operable based on the supply of the fifth voltage V5$r$ from the fifth low voltage power supply circuit 67. The excitation circuit 71 feeds a sinusoidal excitation signal to a resolver stator included in the angle sensor 41. The resolver stator outputs an angle signal, and the signal is input to the resolver-digital converter 73 via the FB interface unit 72. The FB interface unit 72 and the resolver-digital converter 73 are configured to be operable based on the supply of the first voltage V1$r$ from the first low voltage power supply circuit 63. The resolver-digital converter 73 uses the angle signal from the FB interface unit 72 to calculate the electrical angle of the rotating electric machine 10. The calculated electrical angle is input into the microcomputer 60. The microcomputer 60 uses the input electrical angle to calculate the electrical angular velocity of the rotating electric machine 10.

The excitation circuit 71, the FB interface unit 72, and the resolver-digital converter 73 are placed in the low voltage area of the control circuit 50.

The microcomputer 60 includes a CPU and other peripheral circuits. The peripheral circuits include, for example, an A/D conversion unit and an I/O unit for exchanging signals with the outside. The microcomputer 60 is supplied with the first voltage V1$r$ from the first low voltage power supply circuit 63, the second voltage V2$r$ from the second low voltage power supply circuit 64, and the third voltage V3$r$ from the third low voltage power supply circuit 65.

The control circuit 50 includes a voltage sensor 77, an overvoltage detection unit 78, and a state determination unit 79. The voltage sensor 77 is electrically connected to the high potential electrical channel 22H and the low potential electrical channel 22L and configured to be operable based on the supply of the output voltage VB from the input circuit 61 and the fifth voltage V5$r$ from the fifth low voltage power supply circuit 67. The voltage sensor 77 detects the terminal voltage of the smoothing capacitor 24. The value detected by the voltage sensor 77 is input to the microcomputer 60 and the overvoltage detection unit 78.

The overvoltage detection unit 78 is configured to be operable based on the supply of the first voltage V1$r$ from the first low voltage power supply circuit 63. The overvoltage detection unit 78 determines whether the terminal voltage VHd of the smoothing capacitor 24 detected by the voltage sensor 77 is higher than the upper voltage limit. When determining that the terminal voltage is higher than the upper voltage limit, the overvoltage detection unit 78 outputs an overvoltage signal to the microcomputer 60 and the state determination unit 79.

The state determination unit 79 is configured to be operable based on the supply of the first voltage V1$r$ from the first low voltage power supply circuit 63. In the present embodiment, the state determination unit 79 is a logic circuit. The voltage sensor 77, the overvoltage detection unit 78, and the state determination unit 79 are placed in the low voltage area of the control circuit 50.

The control system includes a start switch 28. The start switch 28 is, for example, an ignition switch or a push start switch and turned on or off by the user of the vehicle. When determining that the start switch 28 is turned on, the upper ECU turns on the power switch 33. This switching starts power supply from the low voltage power source 31 to the control circuit 50. In contrast, when determining that the start switch 28 is turned off, the upper ECU turns off the power switch 33. Specifically, when determining that the start switch 28 is turned off, the upper ECU turns off the power switch 33 after a predetermined ending sequence. This switching stops the power supply from the low voltage power source 31 to the control circuit 50.

The microcomputer 60 generates a switching command for each switch SWH, SWL in the switching device unit 20 in order to control the control amount of the rotating electric machine 10 to a command value. The control amount is, for example, torque. The microcomputer 60 generates a switching command based on, for example, the output signal from the angle sensor 41. The switching command is a turning-on command that instructs a switch to be on or a turning-off command that instructs a switch to be off. The microcomputer 60 generates switching commands that bring the upper arm switch SWH and the lower arm switch SWL in each phase alternately into the on state. In the present embodiment, the microcomputer 60 includes a switch command generation unit.

The control circuit 50 includes an isolated power supply 80, upper arm drivers 81, and lower arm drivers 82. In the present embodiment, an individual upper arm driver 81 is installed for each upper arm switch SWH, whereas an individual lower arm driver 82 is installed for each lower arm switch SWL. Accordingly, the total number of installed drivers 81, 82 is six.

The isolated power supply 80 uses a voltage supplied from the input circuit 61 to generate and output an upper arm driving voltage VdH supplied to the upper arm driver 81 and a lower arm driving voltage VdL supplied to the lower arm driver 82. The isolated power supply 80 and each driver 81, 82 are placed in the low voltage area and the high voltage area of the control circuit 50 in a manner that spans the boundary between the low voltage area and the high voltage area. Specifically, the isolated power supply 80 includes an individual upper arm isolated power supply installed for each of the three-phase upper arm drivers 81 and a lower arm isolated power supply shared by the three-phase lower arm drivers 82. In the present embodiment, each upper arm isolated power supply and each lower arm isolated power supply are controlled by a common control unit. Note that the lower arm isolated power supply may be installed for each of the three-phase lower arm drivers 82.

Figure 3:
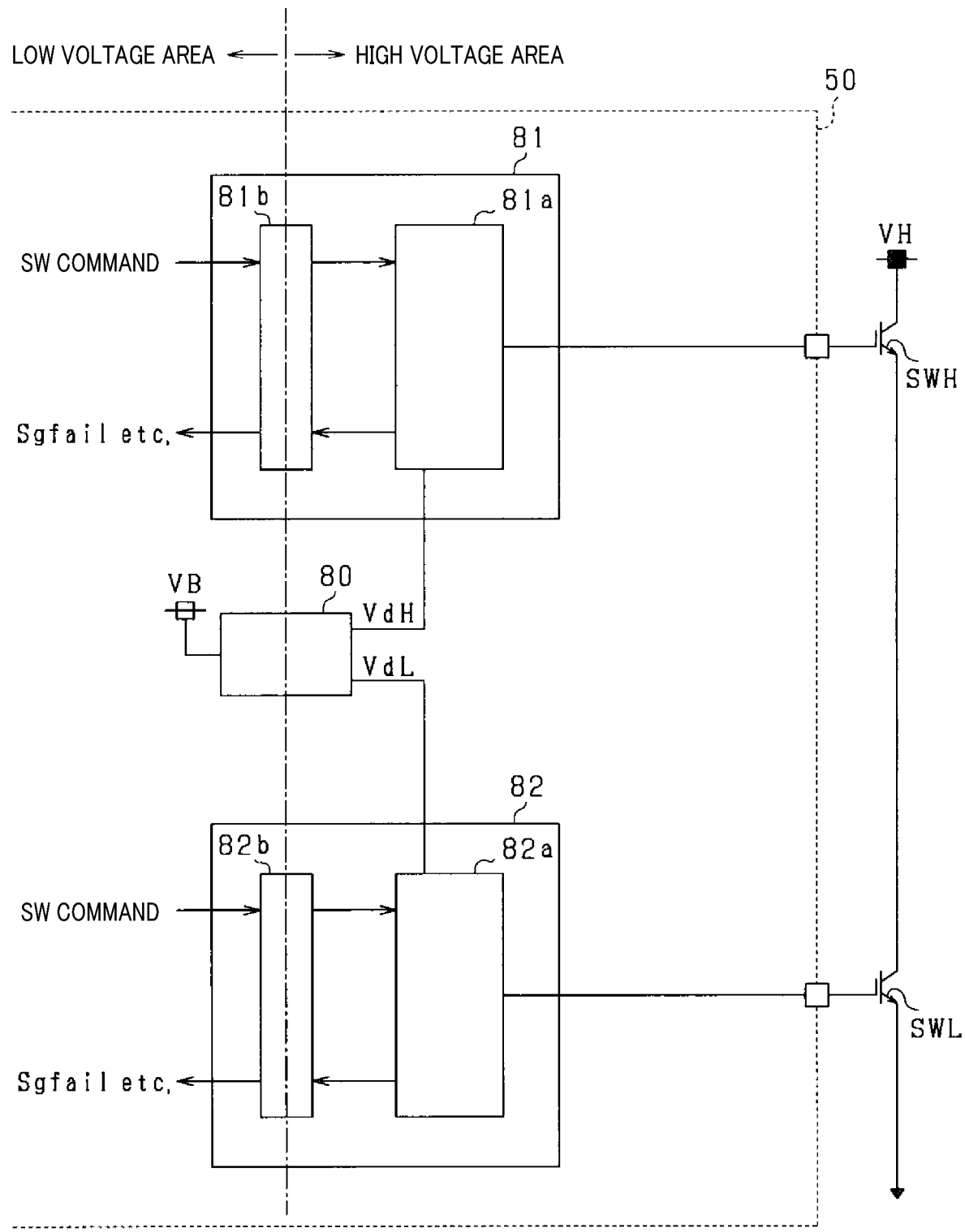
FIG. 3 is a diagram illustrating upper and lower arm drivers and their surroundings.

Referring next to FIG. 3, the upper and lower arm drivers 81, 82 will now be described.

The upper arm driver 81 includes an upper arm drive unit 81a as a switch drive unit and an upper arm insulative transmission unit 81b. The upper arm drive unit 81a is placed in the high voltage area. The upper arm insulative transmission unit 81b is placed in the low voltage area and the high voltage area in a manner that spans the boundary between the low voltage area and the high voltage area. The upper arm insulative transmission unit 81b transmits a switching command output from the microcomputer 60 to the upper arm drive unit 81a while electrically isolating the low voltage area from the high voltage area. The upper arm insulative transmission unit 81b is, for example, a photocoupler or a magnetic coupler.

In the upper arm driver 81, the upper arm drive unit 81a and the part of the upper arm insulative transmission unit 81b in the high voltage area are configured to be operable based on the supply of the upper arm driving voltage VdH from the isolated power supply 80. In the upper arm driver 81, the part of the upper arm insulative transmission unit 81b in the low voltage area is configured to be operable based on the supply of the first voltage V1r from the first low voltage power supply circuit 63.

When the input switching command is a turning-on command, the upper arm drive unit 81a feeds a charging current to the gate of the upper arm switch SWH. As a result, the gate voltage of the upper arm switch SWH becomes equal to or greater than a threshold voltage Vth, and the upper arm switch SWH enters the on state. In contrast, when the input switching command is a turning-off command, the upper arm drive unit 81a passes a discharge current from the gate of the upper arm switch SWH toward the emitter. As a result, the gate voltage of the upper arm switch SWH becomes smaller than the threshold voltage Vth, and the upper arm switch SWH enters the off state.

The upper arm drive unit 81a transmits a failure signal Sgfail indicating that an abnormality has occurred in at least one of the upper arm drive unit 81a and the upper arm switch SWH, and temperature information Tswd about the upper arm switch SWH to the microcomputer 60 via the upper arm insulative transmission unit 81b. Abnormalities in the upper arm switch SWH include at least one of overheating, overvoltage, and overcurrent.

The lower arm driver 82 includes a lower arm drive unit 82a as a switch drive unit and a lower arm insulative transmission unit 82b. In the present embodiment, the drivers 81, 82 have substantially the same configuration. For this reason, a detailed description of the lower arm driver 82 will be omitted as appropriate.

In the lower arm driver 82, the lower arm drive unit 82a and the part of the lower arm insulative transmission unit 82b in the high voltage area are configured to be operable based on the supply of the lower arm driving voltage VdL from the isolated power supply 80. In the lower arm driver 82, the part of the lower arm insulative transmission unit 82b in the low voltage area is configured to be operable based on the supply of the first voltage V1r from the first low voltage power supply circuit 63.

When the input switching command is a turning-on command, the lower arm drive unit 82a feeds a charging current to the gate of the lower arm switch SWL. As a result, the gate voltage of the lower arm switch SWL becomes equal to or greater than the threshold voltage Vth, and the lower arm switch SWL enters the on state. In contrast, when the input switching command is a turning-off command, the lower arm drive unit 82a passes a discharge current from the gate of the lower arm switch SWL toward the emitter. As a result, the gate voltage of the lower arm switch SWL becomes smaller than the threshold voltage Vth, and the lower arm switch SWL enters the off state.

The lower arm drive unit 82a transmits a failure signal Sgfail indicating that an abnormality has occurred in at least one of the lower arm drive unit 82a and the lower arm switch SWL, and temperature information Tswd about the lower arm switch SWL to the microcomputer 60 via the lower arm insulative transmission unit 82b. Abnormalities in the lower arm switch SWL include at least one of overheating, overvoltage, and overcurrent.

Returning to the description of FIG. 2, the control circuit 50 includes a failure detection unit 83. The failure detection unit 83 is placed in the low voltage area and receives a failure signal Sgfail from each driver 81, 82. In the present embodiment, when receiving a failure signal Sgfail from one of the drivers 81, 82, the failure detection unit 83 outputs a logical high (H) abnormality signal SgF to the microcomputer 60 and the state determination unit 79. In contrast, when receiving no failure signal Sgfail from each driver 81, 82, the failure detection unit 83 outputs a logical low (L) abnormality signal SgF to the microcomputer 60 and the state determination unit 79.

The control circuit 50 includes a low voltage ASC command unit 84, a monitor unit 85, an OR circuit 86, and a power supply shutoff unit 87 as an abnormality determination unit. The low voltage ASC command unit 84, the monitor unit 85, the OR circuit 86, and the power supply shutoff unit 87 are placed in the low voltage area. The monitor unit 85 is configured to be operable based on the supply of the output voltage VB from the input circuit 61. The power supply shutoff unit 87 is configured to be operable based on the supply of the fourth voltage V4r from the fourth low voltage power supply circuit 66.

When receiving a low voltage ASC command CmdASC from the state determination unit 79, the low voltage ASC command unit 84 forcibly causes the switching command input to the three-phase lower arm drivers 82 to be a turning-on command, irrespective of the switching command output from the microcomputer 60.

Referring to FIG. 4, the components of the control circuit 50 in the high voltage area will now be described.

The control circuit 50 includes an emergency power supply 90 and a high voltage ASC command unit 91 as a protective control unit. The high voltage ASC command unit 91 is supplied with the lower arm driving voltage VdL from the isolated power supply 80.

The emergency power supply 90 generates an emergency driving voltage Veps based on the supply of an output voltage VH from the smoothing capacitor 24. In the present embodiment, the emergency power supply 90 is a linear power supply and includes a control switch 90a as a voltage adjustment unit and a power supply control unit 90b that controls the drive of the control switch 90a. In the present embodiment, the control switch 90a is an N-channel MOSFET. The input terminal of the emergency power supply 90 (specifically, the drain of the control switch 90a) is connected to the higher potential terminal of the smoothing capacitor 24. The power supply control unit 90b regulates the gate voltage of the control switch 90a so as to control the emergency driving voltage Veps output from the output terminal of the emergency power supply 90 (specifically, the source of the control switch 90a) to a target voltage.

During the period from when the voltage input to the power supply control unit 90b starts increasing based on electricity supplied from the smoothing capacitor 24 to when the input voltage reaches the output voltage of the smoothing capacitor 24, the power supply control unit 90b starts up the emergency power supply 90 in response to the input voltage reaching a specified voltage Vα. In the present embodiment, the start of the emergency power supply 90 refers to the power supply control unit 90b starting to control the emergency driving voltage Veps to the target voltage. In response to the start of this control, the emergency driving voltage Veps starts to increase toward the target voltage. By staring up the emergency power supply 90 when the input voltage reaches the specified voltage Vα, the emergency driving voltage Veps of the emergency power supply 90 becomes controllable early. In the present embodiment, the specified voltage Vα is set at the starting voltage of the power supply control unit 90b.

In the case in which the power supply control unit 90b includes a resistor and a Zener diode, and the gate of the control switch 90a is controlled, the input voltage refers to, for example, the voltage input to the power supply control unit including the resistor and the Zener diode.

In the high voltage area of the control circuit 50, a first regulatory diode 92 is provided in the gate charging channel connecting the lower arm drive unit 82a and the gate of the lower arm switch SWL. The first regulatory diode 92 is provided with its anode connected to the lower arm drive unit 82a. Note that the gate discharging channel of the lower arm switch SWL is now illustrated in FIG. 4.

The control circuit 50 includes an abnormality switch 93. The abnormality switch 93 connects the output terminal of the emergency power supply 90 and a common channel 94. The common channel 94 is connected to the gate of each lower arm switch SWL via second regulatory diodes 95. Each second regulatory diode 95 is provided with its anode connected to the common channel 94. The second regulatory diode 95 prevents charging currents output from the lower arm drive unit 82a to the gate of the lower arm switch SWL from flowing into the common channel 94. In the present embodiment, the gate of each lower arm switch SWL is linked with a parallel-connection body of multiple second regulatory diodes 95. FIG. 4 shows an example in which the gate of each lower arm switch SWL is linked with a parallel-connection body of two second regulatory diodes 95.

Figure 5:
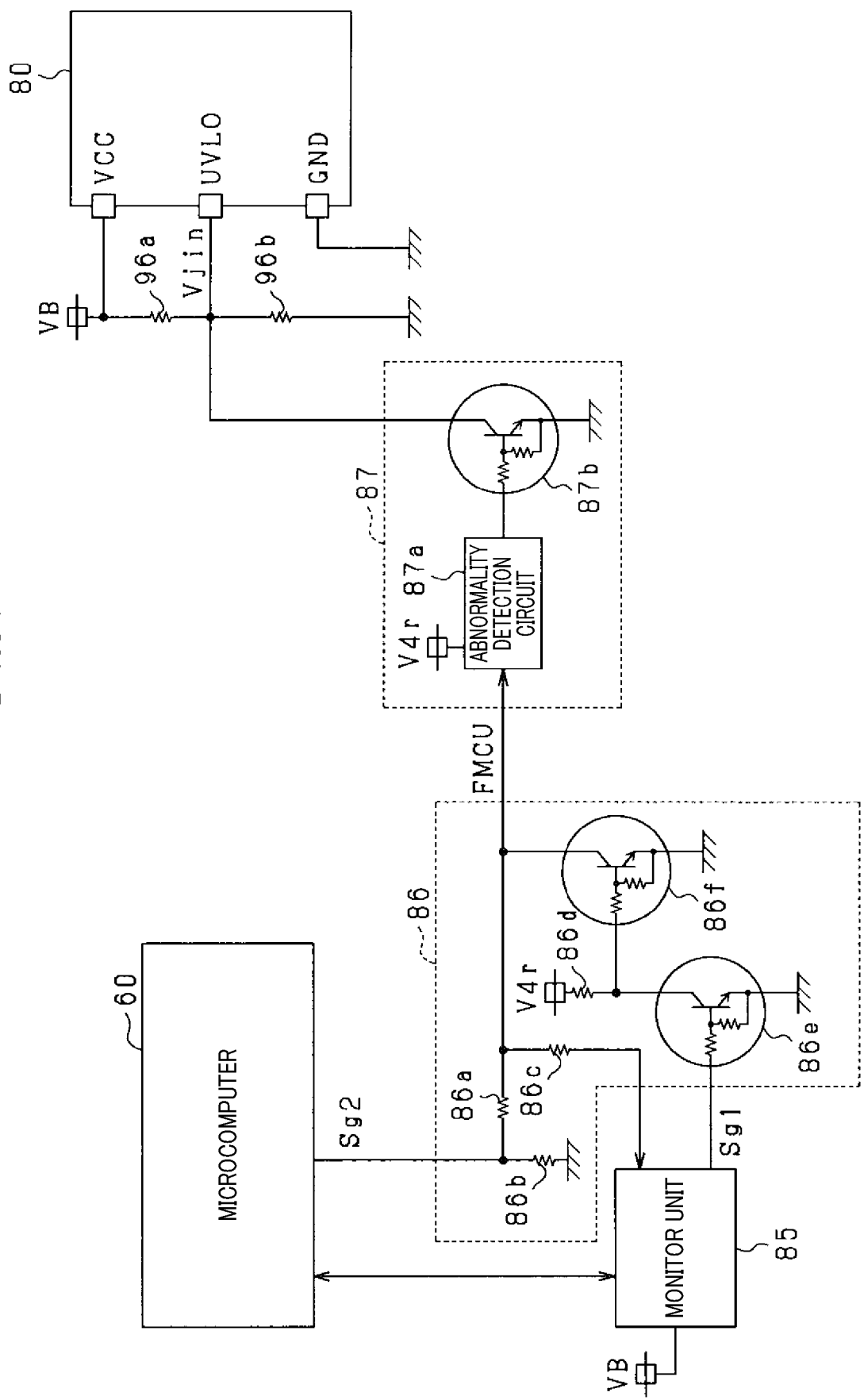
FIG. 5 is a diagram illustrating an OR circuit, a power supply shutoff unit, and their surroundings.

Referring next to FIG. 5, the OR circuit 86, the power supply shutoff unit 87, and their surroundings will now be described. The OR circuit 86 includes first to fourth resistors 86a to 86d and first and second switches 86e, 86f. The first resistor 86a has a first end connected to the microcomputer 60 and the first end of the second resistor 86b. The second end of the second resistor 86b is connected to a ground. The first resistor 86a has a second end connected to the monitor unit 85 via the third resistor 86c.

The fourth resistor 86d has a first end connected to the fourth low voltage power supply circuit 66. The fourth resistor 86d has a second end connected to a ground via the first switch 86e. The base of the first switch 86e is fed with a first determination signal Sg1 from the monitor unit 85. The second end of the first resistor 86a is connected to a ground via the second switch 86f. The base of the second switch 86f is connected to the connection point between the fourth resistor 86d and the first switch 86e.

The microcomputer 60 has a self-monitoring function. If it is determined that no abnormality has occurred in the microcomputer 60, the microcomputer 60 sets the logic level of a second determination signal Sg2 to H. In this case, the OR circuit 86 outputs a logical H abnormality notification signal FMCU. In contrast, if it is determined that an abnormality has occurred in the microcomputer 60, the microcomputer 60 sets the logic level of a second determination signal Sg2 to L. In this case, the logical level of the low abnormality notification signal FMCU is L.

The monitor unit 85 has the function of monitoring whether an abnormality has occurred in the microcomputer 60 and includes, for example, a watchdog counter (WDC) or a function watchdog counter (F-WDC). If it is determined that no abnormality has occurred in the microcomputer 60, the monitor unit 85 sets the logic level of the first determination signal Sg1 to L. In this case, the first and second switches 86e. 86f remain in the off state, and the logic level of the abnormality notification signal FMCU is H. In contrast, determining that an abnormality has occurred in the microcomputer 60, the monitor unit 85 sets the logic level of the first determination signal Sg1 to H. In this case, the first and second switches 86e, 86f are turned on, and the logic level of the abnormality notification signal FMCU is turned into L.

The abnormality notification signal FMCU is input to the power supply shutoff unit 87. The power supply shutoff unit 87 includes an abnormality detection circuit 87a and a switch 87b. The switch 87b has a first end connected to a ground. The switch 87b has a second end connected to the connection point between first and second voltage divider resistors 96a. 96b included in the control circuit 50. The series-connection body of the first and second voltage divider resistors 96a. 96b has a first end connected to the input circuit 61. The series-connection body has a second end connected to a ground. The connection point between the first and second voltage divider resistors 96a, %b is connected to an UVLO terminal on the isolated power supply 80. If a control unit for the isolated power supply 80 determines that a determination voltage Vjin that is a voltage input to the connection point falls below a low voltage threshold VUVLO, the control unit stops the isolated power supply 80 as an undervoltage lockout function. In contrast, if the control unit for the isolated power supply 80 determines that the input determination voltage Vjin has exceeded a release threshold (<VB) higher than the low voltage threshold VUVLO, the control unit stops the undervoltage lockout function and restarts the operation of the isolated power supply 80.

The abnormality detection circuit 87a is configured to be operable based on the supply of the fourth voltage V4r from the fourth low voltage power supply circuit 66. If it is determined that the logic level of the abnormality notification signal FMCU is H, the abnormality detection circuit 87a brings the switch 87b to the off state. In this case, the determination voltage Vjin is equal to or greater than the low voltage threshold VUVLO. In contrast, if it is determined that the logic level of the abnormality notification signal FMCU is L, the abnormality detection circuit 87a brings the switch 87b to the on state. In this case, the determination voltage Vjin is smaller than the low voltage threshold VUVLO, and the undervoltage lockout function is performed. The performed function stops the isolated power supply 80, and the upper arm driving voltage VdH and the lower arm driving voltage VdL start to decrease gradually toward 0 V.

In the present embodiment, three-phase short circuit control (active short circuit, ASC) can be performed even when the control circuit 50 has an abnormality that has conventionally caused a shutdown state. The shutdown state refers to the off state of the three-phase upper and lower arm switches SWH, SWL. Abnormalities in the control circuit 50 include an abnormality in the microcomputer 60, an abnormality in at least one of the intermediate power supply circuit 62 and the first to third low voltage power supply circuits 63 to 65, a failure of the microcomputer 60 to normally transmit a switching command to the upper and lower arm drivers 81, 82, and a failure of the isolated power supply 80 to output a voltage. Examples of the failure of the isolated power supply 80 to output a voltage include an abnormality in the isolated power supply 80 and a failure of the low voltage power source 31 to supply electricity to the isolated power supply 80. The failure of the low voltage power source 31 to supply electricity to the isolated power supply 80 is, for example, caused by a break in the electrical channel from the low voltage power source 31 to the isolated power supply 80, such as the input circuit 61. For the lower arm driver 82, examples of the failure to normally transmit a switching command include a break in the signal channel from the microcomputer 60 to the lower arm insulative transmission unit 82b. Note that the abnormalities described above may result from, for example, a vehicle collision.

Figure 6:
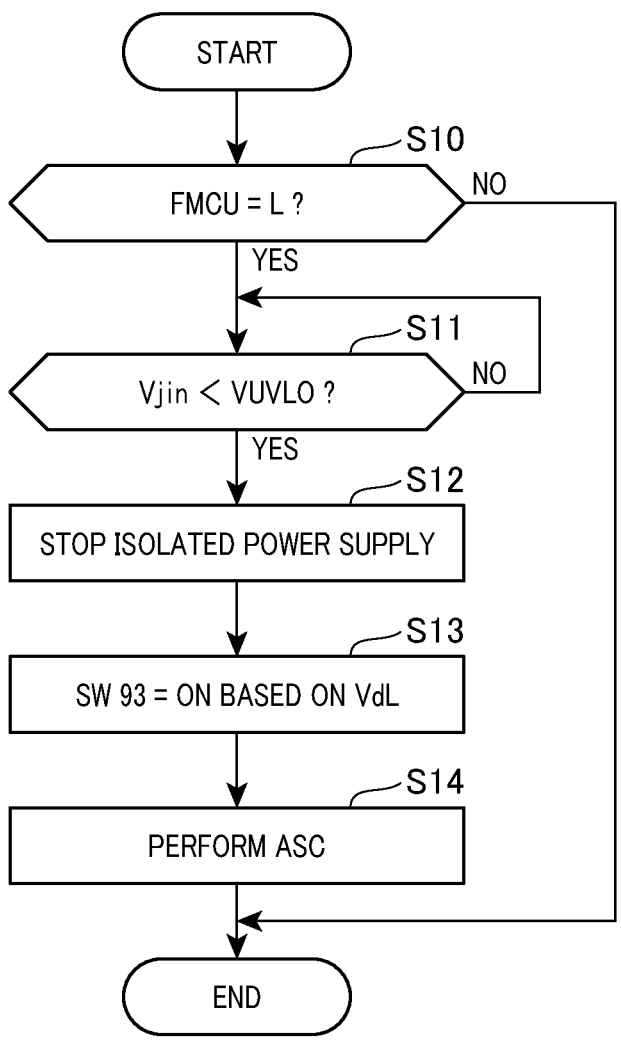
FIG. 6 is a flowchart showing the procedure of three-phase short circuit control.

Referring to FIG. 6, the three-phase short circuit control performed when an abnormality has occurred in the control circuit 50 will now be described.

In step S10, the abnormality detection circuit 87a in the power supply shutoff unit 87 determines whether the input abnormality notification signal FMCU has a logic level of L. When the second determination signal Sg2 output from the microcomputer 60 has a logic level of L, or the first determination signal Sg1 output from the monitor unit 85 has a logic level of H, the abnormality notification signal FMCU has a logic level of L. Even when an abnormality has occurred in the intermediate power supply circuit 62 or the first to third low voltage power supply circuits 63 to 65 serving as power sources for the microcomputer 60, the second determination signal Sg2 output from the microcomputer 60 has a logic level of L.

If it is determined that the abnormality notification signal FMCU has a logic level of L, the abnormality detection circuit 87a turns on the switch 87b. As a result, the determination voltage Vjin input to the UVLO terminal of the isolated power supply 80 decreases toward 0 V, or the ground potential.

In step S11, the power supply control unit for the isolated power supply 80 waits for the determination voltage Vjin to fall below the low voltage threshold VUVLO. When determining that the determination voltage Vjin has fallen below the low voltage threshold VUVLO, the power supply control unit performs the undervoltage lockout function in step S12 to stop the isolated power supply 80. As a result, the upper and lower arm driving voltages VdH. VdL output from the isolated power supply 80 start to decrease toward 0 V.

In step S13, the high voltage ASC command unit 91 detects the lower arm driving voltage VdL output from the isolated power supply 80, and turns on the abnormality switch 93 after the detected lower arm driving voltage VdL starts to decrease. As a result, the emergency power supply 90 starts to directly supply the emergency driving voltage Veps to the gate of each lower arm switch SWL via the abnormality switch 93, the common channel 94, and the second regulatory diodes 95.

Specifically, after the start of the decrease in the detected lower arm driving voltage VdL followed by the elapse of a period sufficient for the upper arm switch SWH to enter the off state, the high voltage ASC command unit 91 turns on the abnormality switch 93. This is intended to prevent a short circuit between the upper and lower arms.

For example, the high voltage ASC command unit 91 may turn on the abnormality switch 93 when determining that the detected lower arm driving voltage VdL has started to decrease and then the detected lower arm driving voltage VdL has fallen below a predetermined voltage Vp. The predetermined voltage Vp is set at a value that allows the determination of the elapse of the period sufficient for the upper arm switch SWH to enter the off state, and for example, the same value as the threshold voltage Vth or a value lower than the threshold voltage Vth.

For example, the high voltage ASC command unit 91 may also turn on the abnormality switch 93 when a predetermined period has elapsed since the start of the decrease in the detected lower arm driving voltage VdL. The predetermined period may be set at a value that allows the determination of the elapse of the period sufficient for the upper arm switch SWH to enter the off state.

Turning on the abnormality switch 93 brings the three-phase lower arm switches SWL into the on state. In other words, the lower arm switches SWL as three-phase on switches enter the on state. Meanwhile, the decrease in the upper arm driving voltage VdH supplied to the upper arm drive unit 81a brings the upper arm switches SWH as three-phase off switches into the off state. As a result, in step S14, three-phase short circuit control is performed.

Figure 7:
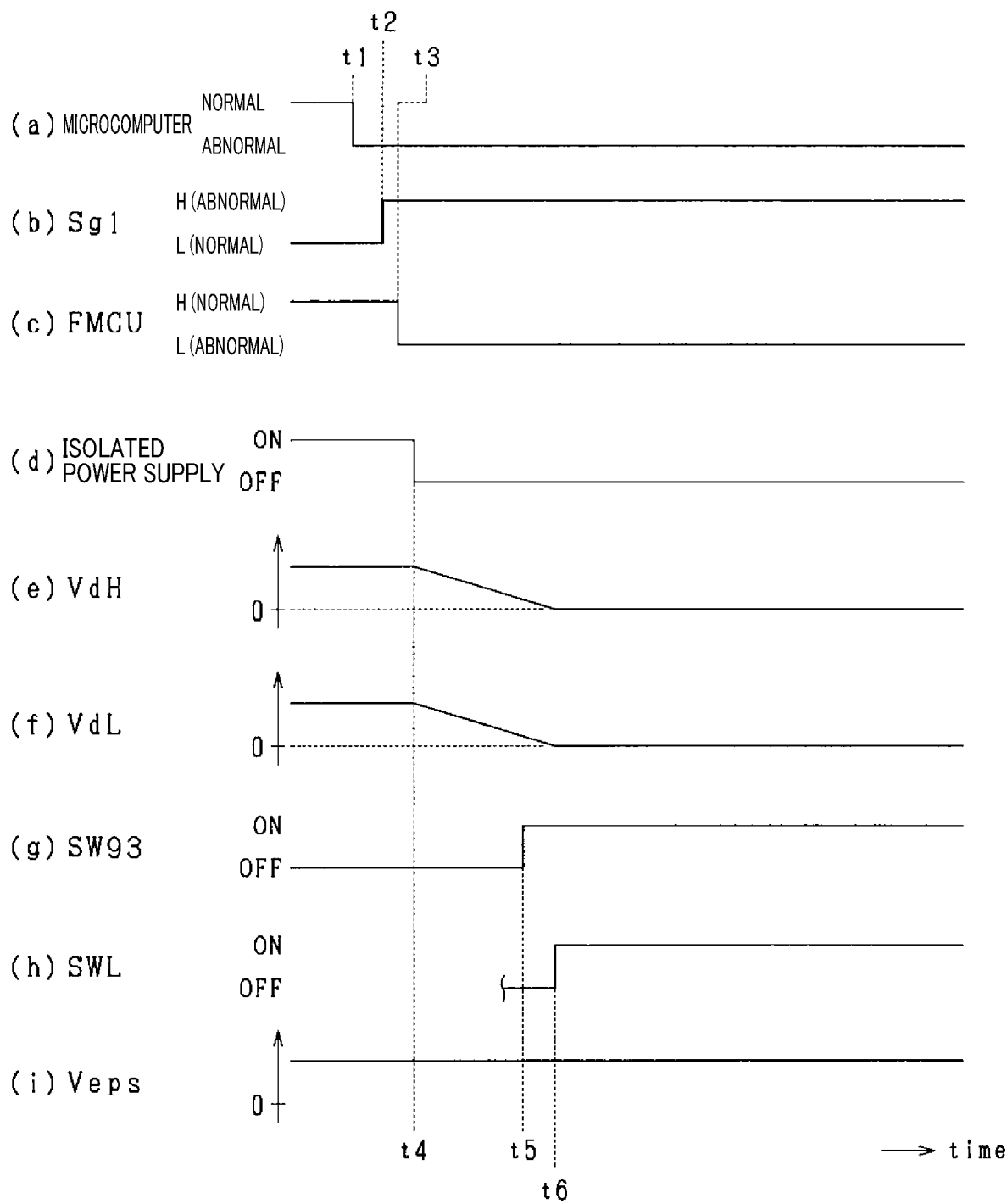
FIG. 7 is a timing chart showing an example of the three-phase short circuit control.

Referring to FIG. 7, the processing of FIG. 6 will now be further described. FIG. 7(a) shows changes in the presence of abnormalities in the microcomputer 60, FIG. 7(b) shows changes in the first determination signal Sg1 output from the monitor unit 85, FIG. 7(c) shows changes in the abnormality notification signal FMCU, and FIG. 7(d) shows changes in the operation state of the isolated power supply 80. FIGS. 7(e) and 7(f) show changes in the upper and lower arm driving voltages VdH, VdL output from the isolated power supply 80, FIG. 7(g) shows changes in the drive state of the abnormality switch 93, and FIG. 7(h) shows changes in the drive state of the lower arm switch SWL in each phase. FIG. 7(i) shows changes in the emergency driving voltage Veps of the emergency power supply 90.

At time t1, an abnormality occurs in the microcomputer 60. Accordingly, at time t2, the logic level of the first determination signal Sg1 output from the monitor unit 85 is reversed to H, and at time t3, the logic level of the abnormality notification signal FMCU is reversed to L. As a result, the switch 87b is turned on, and the undervoltage lockout function is performed for the isolated power supply 80. At time t4, the performed function stops the isolated power supply 80, and the upper and lower arm driving voltages VdH, VdL start to decrease.

After the start of the decrease in the lower arm driving voltage VdL, at time t5, at which a period sufficient for the upper arm switch SWH to enter the off state has elapsed from time t4, the high voltage ASC command unit 91 turns on the abnormality switch 93. Because the emergency driving voltage Veps is controlled at a target voltage during the time span shown in FIG. 7, turning on the abnormality switch 93 starts the power supply from the emergency power supply 90 to the gate of each lower arm switch SWL. Thus, at time t6, the three-phase lower arm switches SWL enter the on state. As described above, the determination as to whether the sufficient period has elapsed may be based on, for example, whether the detected lower arm driving voltage VdL has fallen below the predetermined voltage Vp or whether the predetermined period has elapsed since the start of the decrease in the lower arm driving voltage VdL.

Even in the event of an abnormality in the low voltage power source 31, an abnormality in the input circuit 61, a break in the power channel electrically connecting the low voltage power source 31 and the control circuit 50, or an abnormality in the isolated power supply 80, three-phase short circuit control is performed in accordance with the processing of steps S11 to S14. That is, in this case, the undervoltage lockout function stops the isolated power supply 80, and the upper and lower arm driving voltages VdH, VdL decrease toward 0 V, achieving the three-phase short circuit control.

Even in the event of an overvoltage abnormality, the three-phase short circuit control is performed. Specifically, the state determination unit 79 determines whether an overvoltage signal has been input from the overvoltage detection unit 78. When determining that an overvoltage signal has been input, the state determination unit 79 outputs a low voltage ASC command CmdASC to the low voltage ASC command unit 84.

When the low voltage ASC command unit 84 receives the low voltage ASC command CmdASC, the state determination unit 79 outputs a shutdown command CmdSDN to forcibly cause the switching command input to the three-phase upper arm drivers 81 to be a turning-off command, irrespective of the switching command output from the microcomputer 60. The low voltage ASC command unit 84 also forcibly causes the switching command input to the three-phase lower arm drivers 82 to be a turning-on command, irrespective of the switching command output from the microcomputer 60. In this manner, the three-phase short circuit control is performed.

Returning to the description of FIG. 4, the control circuit 50 includes a discharge processing unit 120 as a protective control unit. The discharge processing unit 120 is placed in the high voltage area of the control circuit 50 and configured to control the discharge of the smoothing capacitor 24 by driving the discharge switch 27.

The discharge processing unit 120 includes an input interface unit 121, a pulse command generation unit 122, and a drive circuit 123. The input interface unit 121 and the pulse command generation unit 122 are configured to be operable based on the supply of a driving voltage Vsb from a drive power supply 140 placed in the high voltage area of the control circuit 50. The drive power supply 140 generates the driving voltage Vsb from the power supplied from the emergency power supply 90. The drive power supply 140, for example, lowers the emergency driving voltage Veps from the emergency power supply 90 to generate the driving voltage Vsb (e.g., 5 V).

The drive circuit 123 is configured to be operable based on the supply of the emergency driving voltage Veps from the emergency power supply 90. Thus, even in the event of an abnormality in which the low voltage power source 31 becomes unable to supply electric power to the control circuit 50, the drive of the discharge switch 27 can be controlled.

The control circuit 50 includes an input-side insulated transfer unit 110. The input-side insulated transfer unit 110 is placed in the low voltage area and the high voltage area in a manner that spans the boundary between the low voltage area and the high voltage area. The input-side insulated transfer unit 110 transmits a discharge command CmdAD output from the microcomputer 60 to the input interface unit 121 while electrically isolating the low voltage area from the high voltage area. The input-side insulated transfer unit 110 is, for example, a photocoupler or a magnetic coupler. The part of the input-side insulated transfer unit 110 in the high voltage area is, for example, configured to be operable based on the supply of the lower arm driving voltage VdL from the isolated power supply 80. The part of the input-side insulated transfer unit 110 in the low voltage area is, for example, configured to be operable based on the supply of the first voltage V1r from the first low voltage power supply circuit 63.

Figure 8:
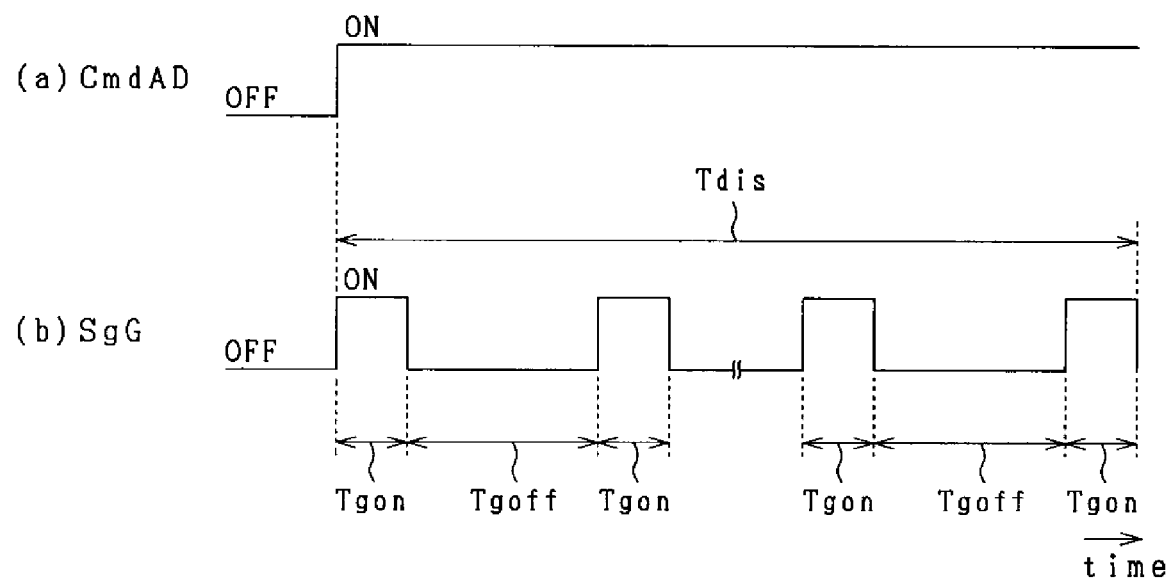
FIG. 8 is a timing chart showing an example of changes in a discharge command and a drive command.

Based on the discharge command CmdAD input via the input interface unit 121 and an output signal from an oscillator 133 described later, the pulse command generation unit 122 generates a drive command SgG output to the drive circuit 123. In the present embodiment, the pulse command generation unit 122, as shown in FIG. 8, generates the drive command SgG including multiple on-pulse commands during the period in which the discharge command CmdAD is input. The multiplicity of the multiple on-pulse commands is intended in case discharge control is performed on the smoothing capacitor 24 with the first and second shutoff switches 23a, 23b in the on state even though the issue of a turning-off command to the first and second shutoff switches 23a, 23b. For example, this situation may occur in the case of a long off-delay time from when a turning-off command is issued to the first and second shutoff switches 23a, 23b to when the first and second shutoff switches 23a, 23b are turned off.

When the discharge switch 27 is brought into the on state with the first and second shutoff switches 23a, 23b in the on state, the smoothing capacitor 24 cannot be discharged, and a direct current flows continuously from the high voltage power source 30 to the discharge resistor 26. As a result, the discharge resistor 26 produces a larger amount of heat, which may break the discharge resistor 26. This problem can be overcome using a discharge resistor 26 with a high resistance. However, such a discharge resistor 26 has a large size.

To address the problem, the drive command SgG including multiple on-pulse commands is used. Such a drive command SgG can include a turning-off command period. As a result, the request to discharge the smoothing capacitor 24 can be met with the discharge resistor 26 maintained in the safest possible state even in the case in which discharge control is performed on the smoothing capacitor 24 with the first and second shutoff switches 23a, 23b in the on state even though the issue of a turning-off command to the first and second shutoff switches 23a, 23b.

FIG. 8(b) shows changes in the drive command SgG according to the present embodiment. Tgon represents the pulse width of each on-pulse command, whereas Tgoff represents the time interval between adjacent on-pulse commands. Tdis represents the total pulse duration, which is the period from the first on-pulse command to the last on-pulse command. The total pulse duration Tdis is set, for example, based on the assumed off-delay time and may be set specifically at a value greater than the maximum value of the assumed off-delay time. The total pulse duration Tdis is set to be longer than the normal discharge period of the smoothing capacitor 24. In the present embodiment, after the output of the first on-pulse command from the pulse command generation unit 122, the discharge switch 27 may be brought into the on state in accordance with the on-pulse command to complete the discharge of the smoothing capacitor 24. In this case, the normal discharge period is the period from the output of the first on-pulse command to the completion of the discharge of the smoothing capacitor 24 (specifically, for example, the maximum value of the assumed period). Note that the period of output signals from the oscillator 133 may be shorter than, for example, the pulse width Tgon.

The pulse width Tgon is related to the period of time from the start of discharge control in response to the output of a discharge command CmdAD to the completion of the discharge of the smoothing capacitor 24, and also related to the amount of heat produced by the discharge resistor 26. The time interval Tgoff between on-pulse commands is related to the adjustment of a temperature decrease in the discharge resistor 26. The pulse width Tgon and the time interval Tgoff may be set based on, for example, the capacitance of the smoothing capacitor 24, the voltage of the high voltage power source 30, the required discharge time, and the thermal design of the discharge resistor 26. The required discharge time is the time required for the completion of the discharge of the smoothing capacitor 24 after the start of discharge control, and specifically, for example, the requirement value of the period of time from when the discharge control is started to when the voltage of the smoothing capacitor 24 decreases and reaches a predetermined voltage.

Returning to the description of FIG. 4, when the input drive command SgG is a turning-on command, the drive circuit 123 feeds a charging current to the gate of the discharge switch 27. As a result, the gate voltage of the discharge switch 27 becomes equal to or greater than a threshold voltage, and the discharge switch 27 enters the on state. In contrast, when the input drive command SgG is a turning-off command, the drive circuit 123 passes a discharge current from the gate of the discharge switch 27. As a result, the gate voltage of the discharge switch 27 becomes smaller than the threshold voltage, and the discharge switch 27 enters the off state.

The control circuit 50 includes a first diode 111a, an operation detection unit 130, an output insulative transmission unit 112, and a demodulation unit 113 as components for verifying whether the three-phase short circuit control can be performed normally. The control circuit 50 also includes a second diode 111b, the operation detection unit 130, the output insulative transmission unit 112, and the demodulation unit 113 as components for verifying whether the discharge control on the smoothing capacitor 24 can be performed normally by driving the discharge switch 27. That is, in the present embodiment, the operation detection unit 130, the output insulative transmission unit 112, and the demodulation unit 113 are shared to verify whether the three-phase short circuit control can be performed normally and to verify whether the discharge control can be performed normally. In the present embodiment, the operation detection unit 130 and the output insulative transmission unit 112 correspond to a notification unit.

The first diode 111a is provided with its anode connected to the common channel 94. The first diode 111a prevents the gate voltage of the discharge switch 27 from being transmitted to the common channel 94. The second diode 111b is provided with its anode connected to the gate of the discharge switch 27. The second diode 111b prevents the emergency driving voltage Veps supplied from the emergency power supply 90 to the common channel 94 from being transmitted to the gate of the discharge switch 27.

The operation detection unit 130 includes a comparator 131, a modulation unit 132, and the oscillator 133. The comparator 131 is configured to be operable based on the supply of the emergency driving voltage Veps from the emergency power supply 90. The modulation unit 132 is configured to be operable based on the supply of the driving voltage Vsb from the drive power supply 140.

The non-inverting input terminal of the comparator 131 is connected to the cathode of each of the first diode 111a and the second diode 111b. The inverting input terminal of the comparator 131 receives a reference voltage Vref.

Figure 9:
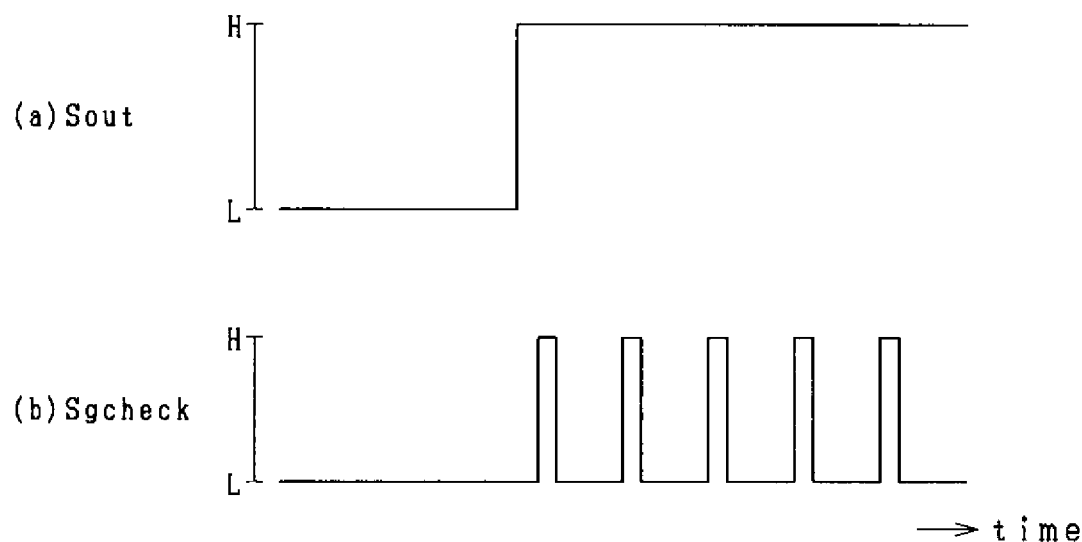
FIG. 9 is a timing chart showing changes in signals such as a check signal.

Based on an output signal Sout from the comparator 131 and an output signal from the oscillator 133, the modulation unit 132 outputs a check signal Sgcheck that is a modulated signal of the output signal from the comparator 131, as shown in FIG. 9.

The output insulative transmission unit 112 is placed in the low voltage area and the high voltage area in a manner that spans the boundary between the low voltage area and the high voltage area. The output insulative transmission unit 112 transmits the check signal Sgcheck output from the modulation unit 132 to the demodulation unit 113 placed in the low voltage area while electrically isolating the low voltage area from the high voltage area. The output insulative transmission unit 112 is, for example, a photocoupler or a magnetic coupler. The part of the output insulative transmission unit 112 in the high voltage area is, for example, configured to be operable based on the supply of the lower arm driving voltage VdL from the isolated power supply 80. The part of the output insulative transmission unit 112 in the low voltage area is, for example, configured to be operable based on the supply of the first voltage V1r from the first low voltage power supply circuit 63. As shown in FIG. 9, the use of check signals Sgcheck in the form of pulse signals can reduce the current consumed by the output insulative transmission unit 112. The reduction can thus reduce the output current from the emergency power supply 90 serving as a power source for the output insulative transmission unit 112.

The demodulation unit 113 generates a demodulated signal Sgin from the input check signal Sgcheck and outputs the generated signal to the microcomputer 60.

In the present embodiment, the verification of whether the three-phase short circuit control can be performed normally and the verification of whether the discharge control on the smoothing capacitor 24 can be performed normally are performed at different times. This is because, as described above, the operation detection unit 130, the output insulative transmission unit 112, and the demodulation unit 113 are shared to verify whether the three-phase short circuit control can be performed normally and to verify whether the discharge control can be performed normally.

First, a method will be described for verifying whether the three-phase short circuit control can be performed normally.

The comparator 131 outputs a logical H signal when the voltage input to its non-inverting input terminal is greater than the reference voltage Vref, and outputs a logical L signal when the input voltage is smaller than the reference voltage Vref. The reference voltage Vref is, for example, set at the threshold voltage of the lower arm switch SWL or a value higher than the threshold voltage of the lower arm switch SWL and lower than the emergency driving voltage Veps.

The modulation unit 132 modulates an output signal Sout from the comparator 131 and outputs the modulated signal as a check signal Sgcheck. The demodulation unit 113 demodulates the input check signal Sgcheck and outputs the resulting demodulated signal Sgin. With the abnormality switch 93 in the on state, if it is determined that the output signal Sout from the comparator 131 has a logic level of H based on the input demodulated signal Sgin, the microcomputer 60 determines that the emergency driving voltage Veps is supplied to the gate of the lower arm switch SWL via the abnormality switch 93, the common channel 94, and the second regulatory diodes 95. That is, the microcomputer 60 determines that the three-phase short circuit control can be performed normally, Then, a method will be described for verifying whether the discharge control can be performed normally.

Based on the input demodulated signal Sgin, the microcomputer 60 determines whether the input-side insulated transfer unit 110, the input interface unit 121, the pulse command generation unit 122, and the drive circuit 123 are normal. In the present embodiment, the normality is determined by the following criteria (A) to (C).

(A) The discharge switch 27 is turned on in response to the drive command SgG switching into a turning-on command, and the discharge switch 27 is turned off in response to the drive command SgG switching into a turning-off command.

(B) The pulse width Tgon of an on-pulse command is equivalent to the period during which the discharge switch 27 is in the on state.

(C) During the total pulse duration Tdis, the number of on-pulse commands included in the drive command SgG is equal to the number of times the discharge switch 27 is turned on in accordance with the on-pulse commands.

In the present embodiment, if it is determined that the above criteria (A) to (C) are satisfied based on the demodulated signal Sgin, the microcomputer 60 determines that the input-side insulated transfer unit 110, the input interface unit 121, the pulse command generation unit 122, and the drive circuit 123 are normal. In contrast, if it is determined that at least one of the above criteria (A) to (C) is not satisfied, the microcomputer 60 determines that at least one of the input-side insulated transfer unit 110, the input interface unit 121, the pulse command generation unit 122, and the drive circuit 123 is not normal. A specific example of the determination method will be described below.

The comparator 131 outputs a logical H signal when the gate voltage Vgs input to its non-inverting input terminal is greater than the reference voltage Vref, and outputs a logical L signal when the input gate voltage Vgs is smaller than the reference voltage Vref. The reference voltage Vref is, for example, set at the threshold voltage of the discharge switch 27 or a value higher than the threshold voltage of the discharge switch 27 and lower than the emergency driving voltage Veps. The microcomputer 60 grasps in advance the transition of the drive command SgG output from the pulse command generation unit 122 during the period of outputting the discharge command CmdAD.

The condition (A) will now be described. After the switching of the logic level of the demodulated signal Sgin into L, if it is determined that the logic level of the demodulated signal Sgin has switched into H during a first determination period, the microcomputer 60 determines that the discharge switch 27 has been turned on in response to the drive command SgG switching into a turning-on command. If it is determined that the logic level of the demodulated signal Sgin has not switched into H during the first determination period, the microcomputer 60 determines that the discharge switch 27 has not been turned on although the drive command SgG has switched into a turning-on command. The first determination period may be, for example, set at a value greater than the pulse width Tgon and equal to or smaller than the total period of the pulse width Tgon and the time interval Tgoff, Tgon+Tgoff. and specifically, may be set at the total period.

After the switching of the logic level of the demodulated signal Sgin into H, if it is determined that the logic level of the demodulated signal Sgin has switched into L during a second determination period, the microcomputer 60 determines that the discharge switch 27 has been turned off in response to the drive command SgG switching into a turning-off command. If it is determined that the logic level of the demodulated signal Sgin has not switched into L during the second determination period, the microcomputer 60 determines that the discharge switch 27 has not been turned off although the drive command SgG has switched into a turning-off command. The second determination period may be, for example, set at a value greater than the time interval Tgoff and equal to or smaller than the total period of the pulse width Tgon and the time interval Tgoff, and specifically, may be set at the total period.

The above criterion (B) will now be described. If it is determined that the period in which the input demodulated signal Sgin has a logic level of H is equivalent to the pulse width Tgon of an on-pulse command, the microcomputer 60 determines that the above criterion (B) is satisfied.

The above criterion (C) will now be described. If the microcomputer 60, based on the input demodulated signal Sgin, determines that the number of on-pulse commands included in the drive command SgG during the total pulse duration Tdis is equal to the number of times the logic level of the check signal Sgcheck switches into H during the total pulse duration Tdis, then the microcomputer 60 determines that the above criterion (C) is satisfied.

Figure 10:
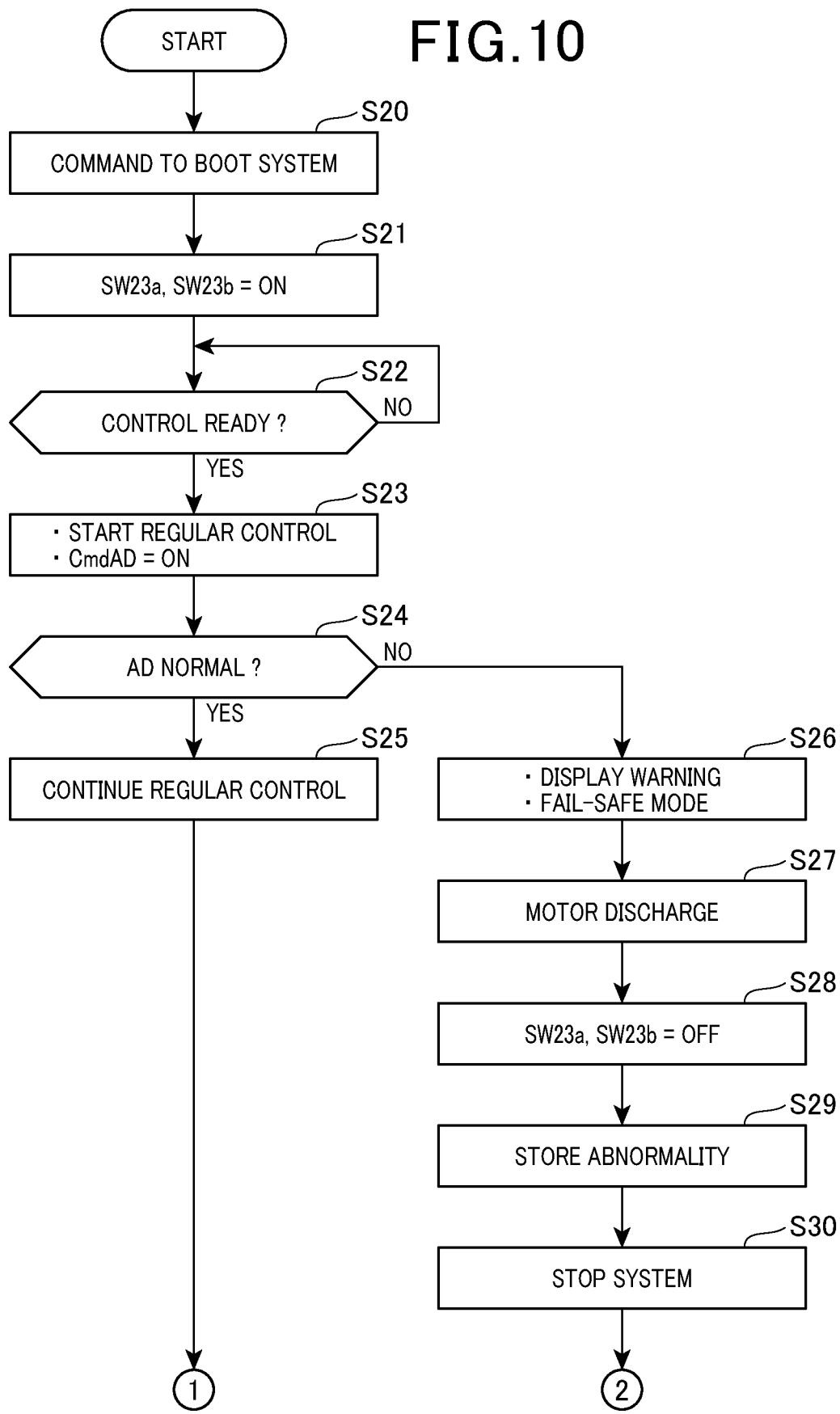
FIG. 10 is a flowchart showing the procedure of determination as to whether discharge control and three-phase short circuit control can be performed normally.
Figure 11:
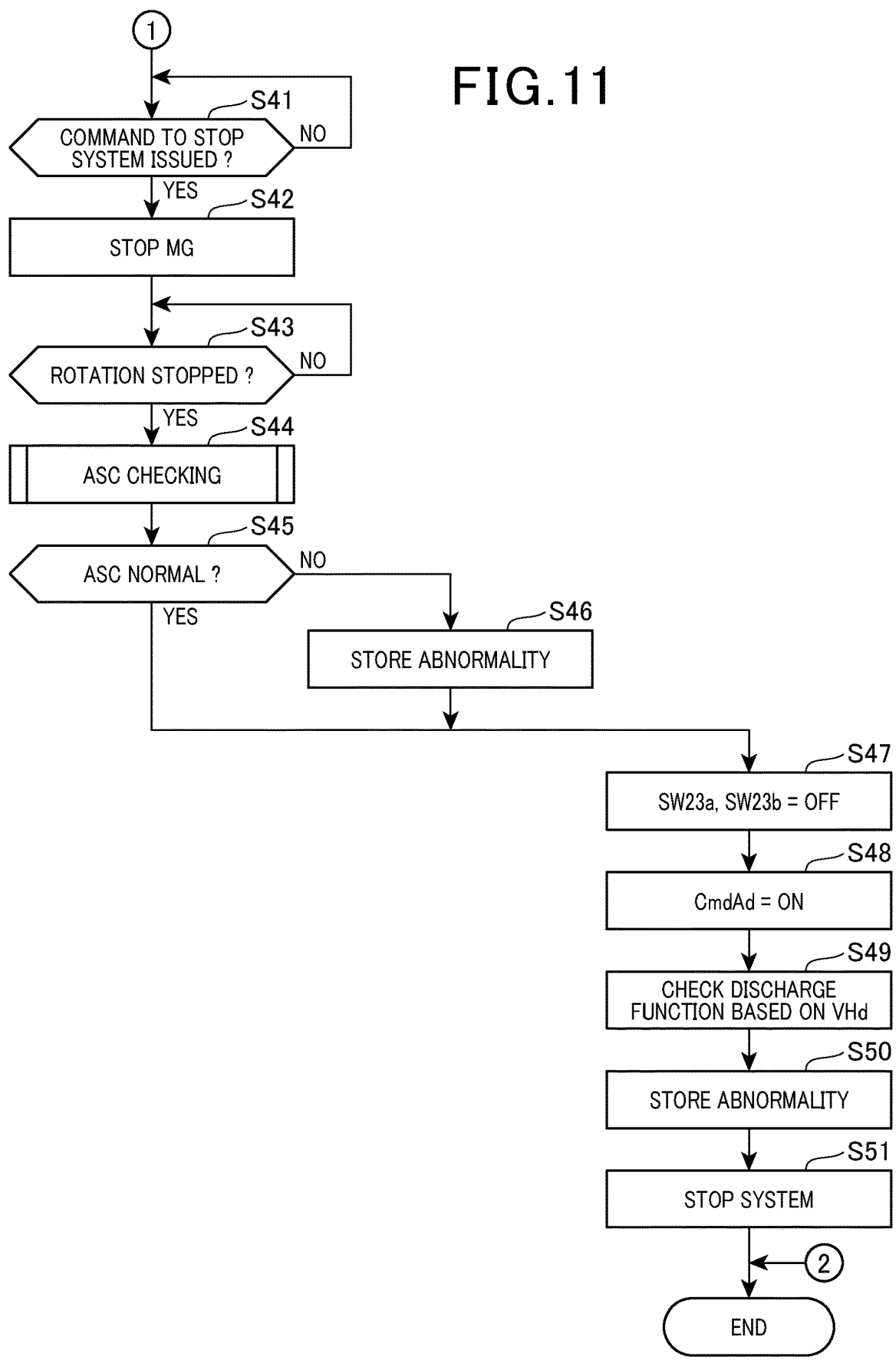
FIG. 11 is a flowchart showing the procedure of determination as to whether the discharge control and the three-phase short circuit control can be performed normally.
Figure 12:
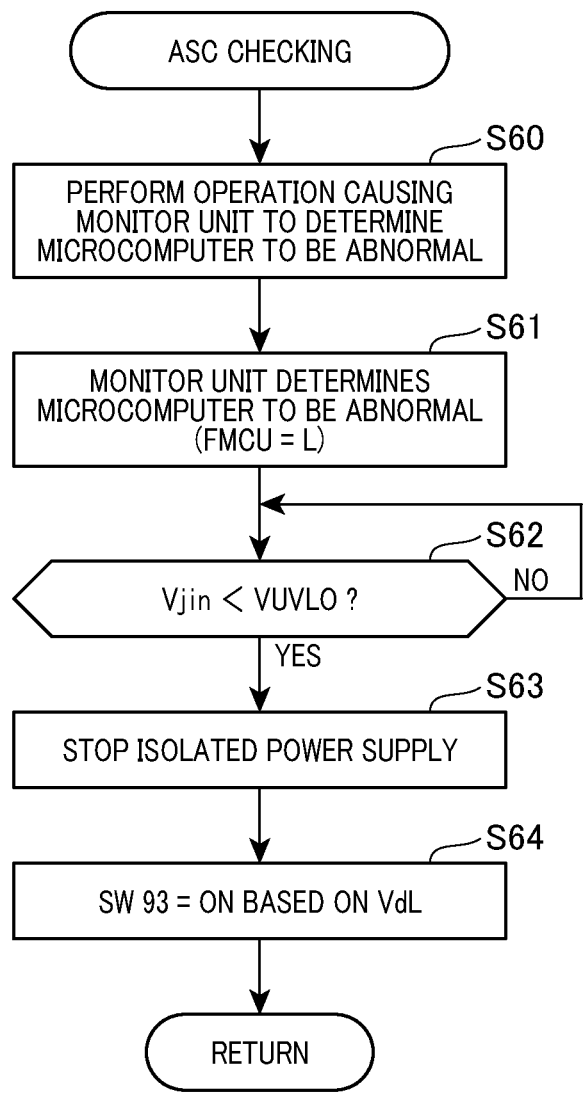
FIG. 12 is a flowchart showing the procedure of ASC checking.

Referring to FIGS. 10 to 12, the procedure of verifying whether the discharge control and the three-phase short circuit control are capable of being performed normally will now be described.

As shown in FIG. 10, in step S20, a command to boot the control system is issued. In the present embodiment, when the upper ECU determines that the start switch 28 has been brought into the on state, and the upper ECU turns on the power switch 33, a command to boot the control system is issued. In step S21, the first shutoff switch 23a and the second shutoff switch 23b are turned on.

In step S22, the process waits the control circuit 50 to be ready for control. In response to determination that the control is ready, the process proceeds to step S23, in which the microcomputer 60 starts regular control. The regular control refers to, for example, control performed to generate and output a switching command to control the control amount of the rotating electric machine 10 to a command value.

In the present embodiment, during one trip from the start of the regular control to the stop of the control system, the verification of whether the discharge control on the smoothing capacitor 24 can be performed normally and the verification of whether the three-phase short circuit control can be performed normally are each performed once. During one trip, the verifications may be performed at any times. For example, the microcomputer 60, during one trip, starts the regular control and also outputs a discharge command CmdAD to the pulse command generation unit 122 to perform the above verifications.

In step S24, the microcomputer 60 determines whether the input-side insulated transfer unit 110, the input interface unit 121, the pulse command generation unit 122, and the drive circuit 123 are normal by using the above criteria (A) to (C) based on the demodulated signal Sgin output from the demodulation unit 113. For example, in the event of an abnormality in which the drive circuit 123 becomes unable to output a voltage to the gate of the discharge switch 27, the output signal Sout from the comparator 131 is fixed at a logic level of L, and thus the demodulated signal Sgin is fixed at a logic level of L. In this case, the microcomputer 60 determines that an abnormality has occurred in at least one of the input-side insulated transfer unit 110, the input interface unit 121, the pulse command generation unit 122, and the drive circuit 123.

If it is determined to be normal in step S24, the microcomputer 60 proceeds to step S25 and continues the regular control.

In the present embodiment, the regular control is performed in parallel with the verification of whether the discharge control on the smoothing capacitor 24 can be performed normally. However, if the verification is performed after the regular control ends and the first and second shutoff switches 23a, 23b are turned off, then the failures described below may occur.

That is, when the first and second shutoff switches 23a, 23b are brought into the off state, the high voltage power source 30 and the smoothing capacitor 24 are electrically disconnected from each other. In this case, the emergency power supply 90 and the drive power supply 140 receive power not from the high voltage power source 30 but from the smoothing capacitor 24.

Then, when the discharge control brings the discharge switch 27 into the on state, the smoothing capacitor 24 is discharged and the emergency power supply 90 and the drive power supply 140 lose their power source. As a result, the emergency power supply 90 cannot supply the emergency driving voltage Veps to the drive circuit 123 and the comparator 131, and also the drive power supply 140 cannot supply the driving voltage Vsb to the input interface unit 121, the pulse command generation unit 122, and the modulation unit 132. Accordingly, the drive circuit 123, the input interface unit 121, the pulse command generation unit 122, and the modulation unit 132 fail to operate.

With the drive command SgG including multiple on-pulse commands, the smoothing capacitor 24 may be discharged completely by turning-on of the discharge switch 27 in accordance with the first on-pulse command. In this state, the drive circuit 123, the input interface unit 121, the pulse command generation unit 122, and the modulation unit 132 can no longer operate, resulting in a failure to verify whether the discharge switch 27 is driven in an intended manner in accordance with the second and subsequent on-pulse commands.

In the present embodiment, however, the regular control is performed in parallel with the verification of whether the discharge control on the smoothing capacitor 24 can be performed normally. In other words, with the first and second shutoff switches 23a, 23b in the on state, it is verified whether the discharge control can be performed normally. Thus, the high voltage power source 30 can serve as a power source for the emergency power supply 90 and the drive power supply 140, enabling the drive circuit 123, the input interface unit 121, the pulse command generation unit 122, and the modulation unit 132 to operate. This allows the verification of whether the discharge switch 27 is driven in an intended manner in accordance with the second and subsequent on-pulse commands.

Note that the verification of whether the discharge control on the smoothing capacitor 24 can be performed normally may be executed under the condition that the high voltage power source 30 has at least a predetermined voltage. This is based on the fact that when the discharge control brings the discharge switch 27 into the on state, a current flows from the high voltage power source 30 to the discharge resistor 26, which consumes the power from the high voltage power source 30.

Note that if it is determined that it cannot be performed normally in step S24, the microcomputer 60 proceeds to step S26, in which the microcomputer 60 displays a warning notifying the user of the abnormality and switches the vehicle running mode into a fail-safe mode. In step S27, the microcomputer 60 discharges the smoothing capacitor 24 by causing the switching device unit 20 to pass a current to the winding 11. Then, in step S28, the first shutoff switch 23a and the second shutoff switch 23b are turned off, and the process proceeds to step S29.

In step S29, the microcomputer 60 stores the details of the abnormality that has occurred into a memory 60a serving as a storage unit included in the microcomputer 60. The memory 60a is a non-transient tangible storage medium other than ROM (e.g., a non-volatile memory other than ROM). Then, in step S30, the upper ECU turns off the power switch 33. This switching stops the low voltage power source 31 from supplying power to the control circuit 50.

As shown in FIG. 11, during the regular control, it is determined in step S41 whether a command to stop the control system is issued. In the present embodiment, when the upper ECU determines that the start switch 28 has been brought into the off state, a stop command is issued.

If the result of the determination in step S41 is negative, the microcomputer 60 continues the regular control.

In contrast, if the result of the determination in step S41 is positive, the ECU instructs the microcomputer 60 to run the subsequent ending sequence. Specifically, in steps S42 to S46, it is verified whether the three-phase short circuit control can be performed normally.

In step S42, the microcomputer 60 stops the rotating electric machine 10. In the present embodiment, when the upper ECU determines that the start switch 28 is brought into the off state, the ECU instructs the microcomputer 60 to execute the stopping.

After stopping the rotating electric machine 10, the microcomputer 60, in step S43, waits for the rotor of the rotating electric machine 10 to stop rotating. The determination as to whether the rotor has stopped rotating may be performed based on, for example, an electrical angular velocity.

If the microcomputer 60 determines that the rotor has stopped rotating, the process proceeds to step S44 to perform ASC checking. FIG. 12 shows the procedure of the ASC checking.

In step S60, the microcomputer 60 disables the monitor unit 85 from resetting the microcomputer 60 and intentionally performs an operation that causes the monitor unit 85 to determine that an abnormality has occurred in the microcomputer 60. The processing of step S60 is intended to instruct the lower arm switches SWL to be on in response to the stop of the isolated power supply 80.

In step S61, the monitor unit 85 determines that an abnormality has occurred in the microcomputer 60, and sets the logic level of the first determination signal Sg1 to H. As a result, the logic level of the abnormality notification signal FMCU is set to L. When determining that the logic level of the abnormality notification signal FMCU is L, the abnormality detection circuit 87a brings the switch 87b into the on state. As a result, the determination voltage Vjin input to the UVLO terminal of the isolated power supply 80 decreases toward 0 V.

In step S62, the control unit for the isolated power supply 80 waits for the determination voltage Vjin to fall below the low voltage threshold VUVLO. When determining that the determination voltage Vjin has fallen below the low voltage threshold VUVLO, the control unit for the isolated power supply 80 performs the undervoltage lockout function in step S63 to stop the isolated power supply 80. As a result, the upper and lower arm driving voltages VdH, VdL output from the isolated power supply 80 start to decrease toward 0 V.

In step S64, the high voltage ASC command unit 91 detects the lower arm driving voltage VdL output from the isolated power supply 80, and turns on the abnormality switch 93 after the detected lower arm driving voltage VdL starts to decrease. The time to turn on the abnormality switch 93 in step S64 may be the same as the time to turn on the abnormality switch 93 in step S13 in FIG. 6, which has been described above.

Returning to the description of FIG. 11, in step S45, the microcomputer 60 uses the input demodulated signal Sgin and the above-described method to determine whether the three-phase lower arm switches SWL can be brought into the on state. Specifically, if the microcomputer 60 uses the demodulated signal Sgin to determine that the check signal Sgcheck, which is a state signal about the lower arm switches SWL, has a logic level of H, then the microcomputer 60 determines that the three-phase lower arm switches SWL can be brought into the on state. If it is determined that the check signal Sgcheck has a logic level of L, then the microcomputer 60 determines that the three-phase lower arm switches SWL cannot be brought into the on state.

If it is determined that the three-phase lower arm switches SWL cannot be brought into the on state, the microcomputer 60 determines that the three-phase short circuit control cannot be performed normally, and proceeds to step S46. In step S46, the microcomputer 60 causes the memory 60a to store information about the failure detected during the ASC checking. Then, the microcomputer 60 proceeds to step S47.

In contrast, if it is determined that the three-phase lower arm switches SWL can be brought into the on state, the microcomputer 60 determines that the three-phase short circuit control can be performed normally, and proceeds to step S47. In step S47, the first shutoff switch 23a and the second shutoff switch 23b are turned off.

In step S48, the microcomputer 60 outputs a discharge command CmdAD to the pulse command generation unit 122. During the period in which the discharge command CmdAD is input, the pulse command generation unit 122 outputs the drive command SgG, which has been shown in FIG. 8(b), to the drive circuit 123. The drive of the discharge switch 27 is controlled based on the drive command SgG to discharge the smoothing capacitor 24.

In step S49, the microcomputer 60 determines whether the smoothing capacitor 24 is discharging normally through the discharge resistor 26 based on the terminal voltage VHd of the smoothing capacitor 24 detected by the voltage sensor 77 during the period in which the discharge control reduces the terminal voltage of the smoothing capacitor 24 toward 0. Specifically, if the microcomputer 60 determines that the detected terminal voltage VHd of the smoothing capacitor 24 decreases similarly to the way in which the terminal voltage of the smoothing capacitor 24 decreases when the smoothing capacitor 24 is discharged normally, then the microcomputer 60 determines that the smoothing capacitor 24 is discharging normally, that is, the drive circuit 123, the discharge switch 27, and the discharge resistor 26 are normal.

In contrast, if the microcomputer 60 determines that the detected terminal voltage VHd of the smoothing capacitor 24 decreases differently from the way in which the terminal voltage of the smoothing capacitor 24 decreases when the smoothing capacitor 24 is discharged normally, then the microcomputer 60 determines that the smoothing capacitor 24 is not discharged normally, that is, at least one of the drive circuit 123, the discharge switch 27, and the discharge resistor 26 is not normal. By determining the normality in each of step S24 in FIG. 10, which has been described above, and step S49, the microcomputer 60 determines that the discharge control can be performed normally.

In addition to the verification of whether the discharge control is normal in step S24 in FIG. 10, which has been described above, the normality of the discharge control is verified in step S49. This is for the following reasons.

In the verification in step S24, the pulse command generation unit 122 outputs the drive command SgG to the drive circuit 123 in response to the discharge command CmdAD from the microcomputer 60. Then, the demodulated signal Sgin based on the gate voltage Vgs of the discharge switch 27 is input to the microcomputer 60. Thus, the demodulated signal Sgin is a parameter indicating whether the channel from the microcomputer 60 to the gate of the discharge switch 27 through the drive circuit 123 is normal.

However, even when changes in the demodulated signal Sgin based on the gate voltage Vgs are similar to changes in the drive command SgG, the discharge switch 27 may not have been in the on state and the off state in accordance with the drive command SgG.

To obviate the defect, in step S49 in the present embodiment, the terminal voltage VHd of the smoothing capacitor 24 detected by the voltage sensor 77 is used to verify whether the smoothing capacitor 24 is discharging normally through the discharge resistor 26. In the case in which the terminal voltage VHd of the smoothing capacitor 24 decreases similarly to the way in which the terminal voltage of the smoothing capacitor 24 decreases when the smoothing capacitor 24 is discharged normally, the discharge switch 27 seems to have been in the on state and the off state in accordance with the drive command SgG. Thus, the execution of the processing of step S49 in addition to the processing of step S24 can improve the accuracy in determining whether the discharge control can be performed normally. In the present embodiment, the processing of steps S24, S45, and S49 constitutes a protection determination unit.

After the completion of the discharge of the smoothing capacitor 24 in the processing of step S49, the emergency power supply 90 and the drive power supply 140 can no longer output electric power. Accordingly, the input interface unit 121, the pulse command generation unit 122, the drive circuit 123, the comparator 131 and the modulation unit 132 can no longer operate. In the present embodiment, when the processing of step S49 is performed with the first and second shutoff switches 23a, 23b turned off, the turning-on of the discharge switch 27 in accordance with the first on-pulse command completes the discharge of the smoothing capacitor 24.

In step S50, if the microcomputer 60 has determined an abnormality in at least of steps S24 and S49, the microcomputer 60 stores the details of the abnormality that has occurred into the memory 60a.

After the completion of the predetermined ending sequence, in step S51, the upper ECU turns off the power switch 33. This switching stops the low voltage power source 31 from supplying power to the control circuit 50.

Figure 13:
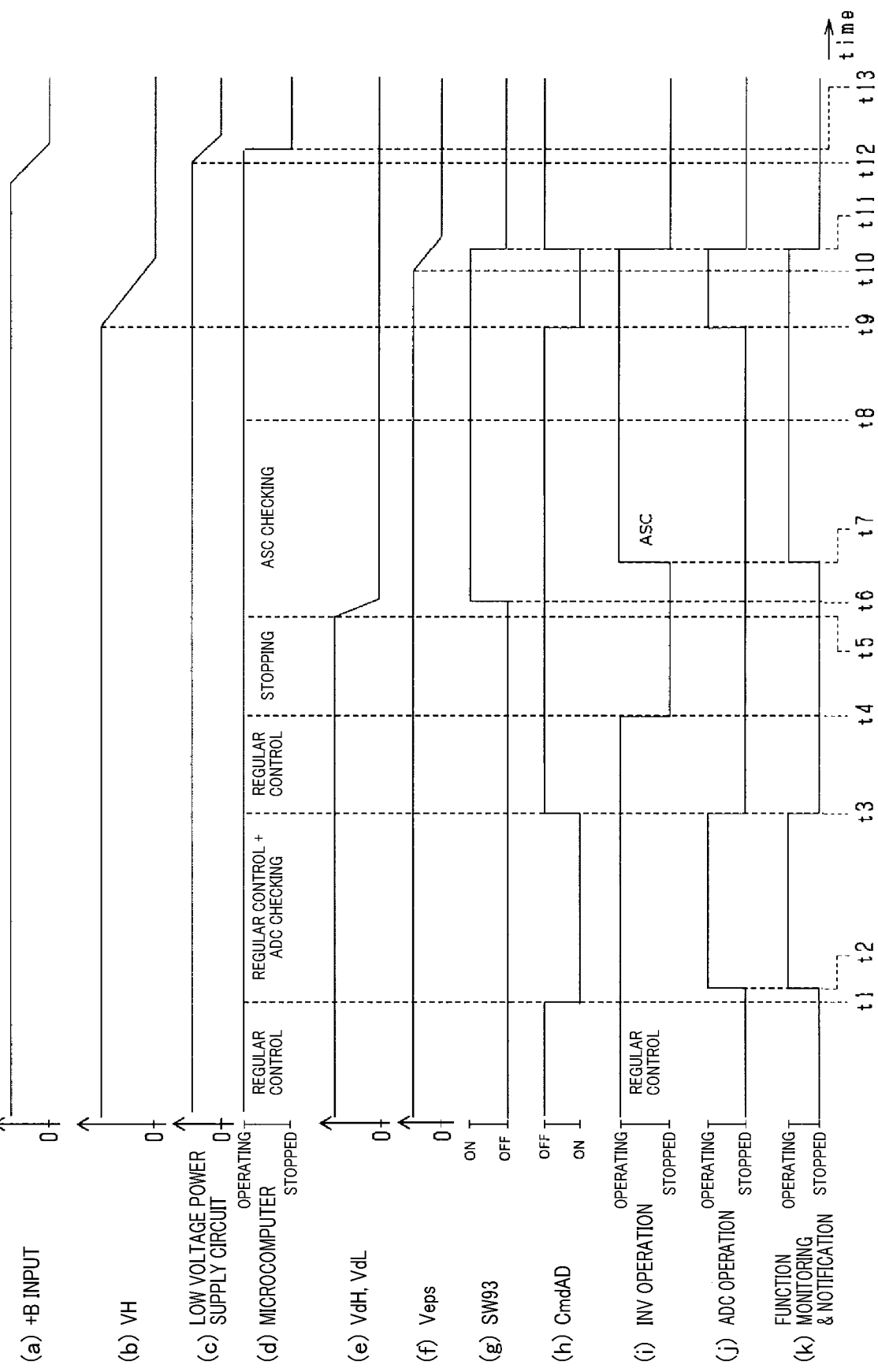
FIG. 13 is a timing chart showing an example of determination as to whether the discharge control and the three-phase short circuit control can be performed normally.

Referring to FIG. 13, the processing in FIGS. 10 to 12 will now be described. FIG. 13(a) shows changes in the input voltage from the low voltage power source 31 to the control circuit 50, FIG. 13(b) shows changes in the terminal voltage VH of the smoothing capacitor 24, and FIG. 13(c) shows changes in the output voltage of the first to third low voltage power supply circuits 63 to 65. Although, actually, the first to third low voltage power supply circuits 63 to 65 have different changes in output voltage, FIG. 13(c) shows the changes in a simplified manner.

FIG. 13(d) shows changes in the operation state of the microcomputer 60, FIG. 13(e) shows changes in the upper and lower arm driving voltages VdH, VdL, FIG. 13(f) shows changes in the emergency driving voltage Veps, and FIG. 13(g) shows changes in the drive state of the abnormality switch 93. FIG. 13(h) shows changes in the discharge command CmdAD, FIG. 13(i) shows changes in the operation state of the switching device unit 20, FIG. 13(j) shows changes in the operation state of the components for discharge control of the smoothing capacitor 24, and FIG. 13(k) shows changes in the operation state of the operation detection unit 130.

In the example shown in FIG. 13, at times t1 to t3 during the regular control, it is verified whether the discharge control can be performed normally. Specifically, the verification is started at time t1. Then, at times t2 to t3, it is determined whether the input-side insulated transfer unit 110, the input interface unit 121, the pulse command generation unit 122, and the drive circuit 123 are normal by using the above criteria (A) to (C).

The determination of the normality allows the regular control to continue at time t3 and later. Then, at time t4, a command to stop the control system is determined to have been issued, and the stopping of the rotating electric machine 10 is started. Then, when the rotor of the rotating electric machine 10 stops rotating, the ASC checking in step S44 is started at time t5. After the start of this processing, first, the microcomputer 60 intentionally performs an operation that causes the monitor unit 85 to determine that an abnormality has occurred in the microcomputer 60. Then, the control unit for the isolated power supply 80 performs the undervoltage lockout function to stop the isolated power supply 80. As a result, the upper and lower arm driving voltages VdH, VdL output from the isolated power supply 80 start to decrease at time t5. After the detected lower arm driving voltage VdL starts to decrease, the high voltage ASC command unit 91 turns on the abnormality switch 93 at time t6.

Then, at time t7, the three-phase lower arm switches SWL are turned on, and thus the microcomputer 60 determines that the three-phase short circuit control can be performed normally.

Then, at time t8, the first shutoff switch 23a and the second shutoff switch 23b are turned off. At times t9 to t11, it is verified whether the discharge control on the smoothing capacitor 24 can be performed normally. Specifically, the verification determines whether the detected terminal voltage VHd of the smoothing capacitor 24 decreases during a specified period similarly to the way in which the terminal voltage of the smoothing capacitor 24 decreases during the specified period when the smoothing capacitor 24 is discharged normally. If the similarity is determined, the drive circuit 123, the discharge switch 27, and the discharge resistor 26 are determined to be normal. The determination result from this verification and the determination result from the verification of the discharge control performed at times t2 to t3 are combined to ensure the normal operation of the overall configuration for the discharge control on the smoothing capacitor 24.

At times t9 to t10, although the three-phase short circuit control and the discharge control on the smoothing capacitor 24 are performed simultaneously, and the operation detection unit 130 monitors the operation state, it is not verified whether each of the three-phase short circuit control and the discharge control can be performed normally. As described above, the verification of whether the three-phase short circuit control can be performed normally and the verification of whether the discharge control can be performed normally are performed at different times. Note that the discharge control starts to reduce the terminal voltage VH of the smoothing capacitor 24 at time t9, and accordingly the emergency driving voltage Veps starts to decrease at time t10.

Then, at time t11, the abnormality switch 93 is turned off, and the verification of whether the discharge control can be performed normally is completed. Then, the upper ECU turns off the power switch 33. This switching stops the low voltage power source 31 from supplying power to the control circuit 50, and at time t12, the output voltage of the first to third low voltage power supply circuits 63 to 65 starts to decrease. As a result, the operation of the microcomputer 60 stops at time t13.

Figure 14:
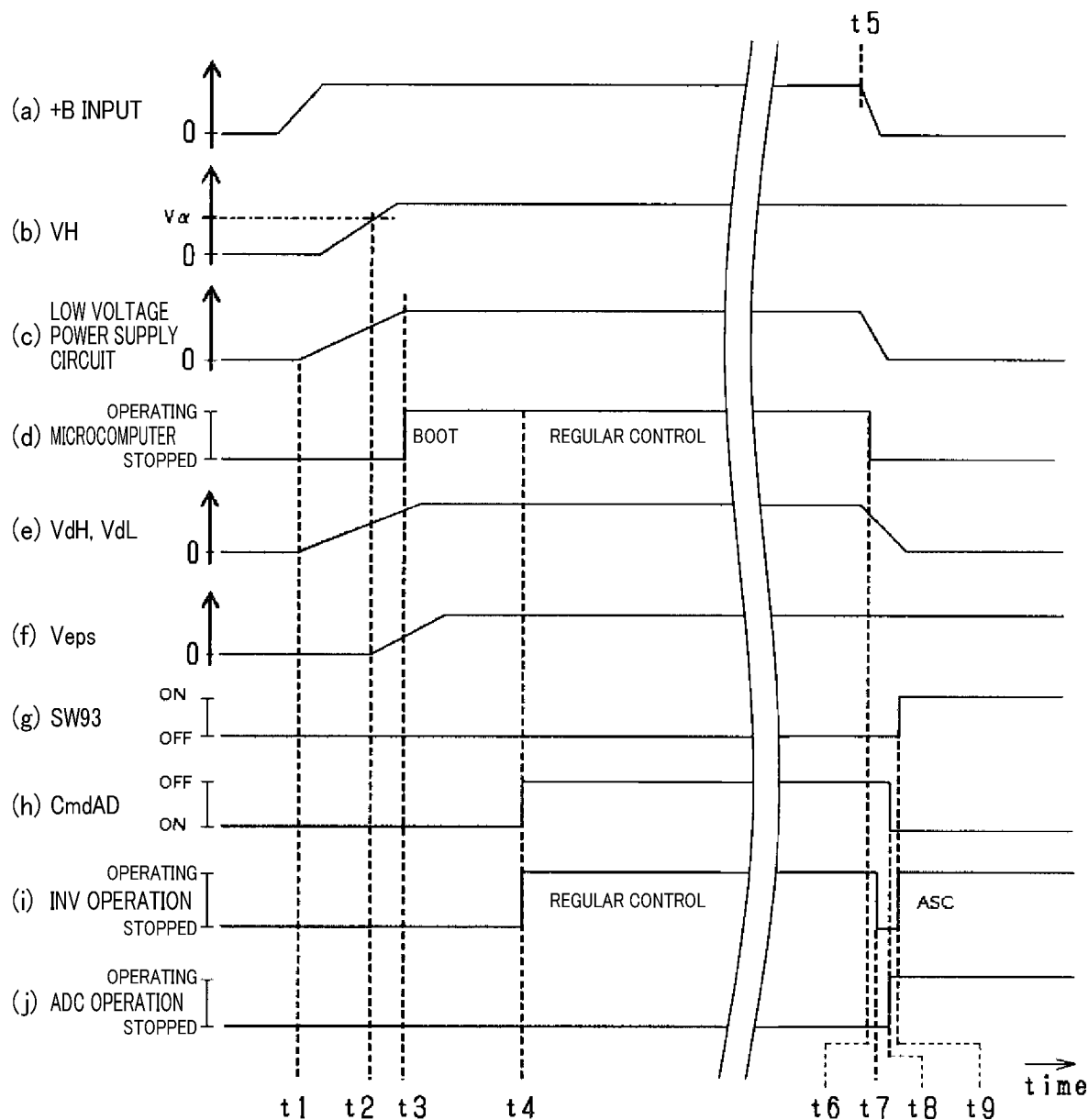
FIG. 14 is a timing chart showing an example implementation of the discharge control and the three-phase short circuit control when an abnormality occurs.

Referring to FIG. 14, the following describes three-phase short circuit processing and discharging in the event of an abnormality in which the low voltage power source 31 becomes unable to supply electric power to the control circuit 50 during the regular control. FIGS. 14(a) to 14(j) correspond to FIGS. 13(a) to 13(j), which have been described previously.

When the power switch 33 is turned on, the low voltage power source 31 supplies electric power to the control circuit 50. As a result, at time t1, the output voltage of the first to third low voltage power supply circuits 63 to 65 starts to increase from 0. In addition, when the first and second shutoff switches 23a, 23b are turned on, the terminal voltage VH of the smoothing capacitor 24 starts to increase from 0.

Then, after the terminal voltage of the smoothing capacitor 24 starts to increase and before the terminal voltage VH becomes the output voltage of the high voltage power source 30, or specifically at time t2, the terminal voltage VH of the smoothing capacitor 24 reaches the specified voltage Vα. In other words, the input voltage of the power supply control unit 90b included in the emergency power supply 90 reaches the specified voltage Vα (specifically, the starting voltage of the power supply control unit 90b). This makes the output voltage of the emergency power supply 90 controllable. Then, at time t3, the microcomputer 60 boots up, and at time t4, the microcomputer 60 starts the regular control.

At time t5, for example, the electrical channel connecting the low voltage power source 31 and the input circuit 61 breaks, causing an abnormality in which the low voltage power source 31 becomes unable to supply electric power to the control circuit 50. Thus, the undervoltage lockout function stops the isolated power supply 80, and the upper and lower arm driving voltages VdH, VdL start to decrease. The output voltage of the first to third low voltage power supply circuits 63 to 65 also decreases to stop the operation of the microcomputer 60 at time t6. This stopping causes the regular control to stop at time t7, and the switching control on the switching device unit 20 also stops.

Because the output voltage of the emergency power supply 90 is already controllable, the output of the discharge command CmdAD later at time t8 allows rapid discharge control on the smoothing capacitor 24 through the drive control on the discharge switch 27. At time t9 during the discharge control, the high voltage ASC command unit 91 turns on the abnormality switch 93, causing the emergency power supply 90 to supply a charging current rapidly to the gates of the three-phase lower arm switches SWL. This enables three-phase short circuit control to be performed rapidly.

According to the present embodiment described in detail above, the effects described below are achieved.

During the period from when the voltage input to the power supply control unit 90b starts increasing based on electricity supplied from the smoothing capacitor 24 to when the input voltage reaches the output voltage of the smoothing capacitor 24, the power supply control unit 90b starts up the emergency power supply 90 when the input voltage reaches the specified voltage Vα. This starting makes the output voltage of the emergency power supply 90 controllable, ensuring electric power for three-phase short circuit control from the emergency power supply 90. This enables three-phase short circuit control to be performed rapidly when an abnormality occurs later in the control system. This can appropriately prevent overvoltage in the smoothing capacitor 24. Further, when an abnormality occurs in the control system, the discharge control on the smoothing capacitor 24 can be rapidly performed.

The emergency power supply 90 and the gate of each lower arm switch SWL are connected together via the abnormality switch 93, the common channel 94, and the second regulatory diodes 95 without routing the connection through the lower arm drive unit 82a. In the event of an abnormality in the control system, this configuration enables three-phase short circuit control to be performed without the operation of the lower arm drive unit 82a. Thus, the three-phase short circuit control can be performed with the lower arm drive unit 82a consuming lower power, which contributes to a reduction in the output current from the emergency power supply 90. This results in a reduction in the heat produced by the emergency power supply 90.

The emergency power supply 90 used is a linear power supply. This configuration obviates the need for components such as an inductor for controlling the output voltage of the emergency power supply 90, allows the emergency power supply 90 to have a simpler configuration, and thus reduces the cost of the emergency power supply 90.

Based on the gate voltage Vgs of the discharge switch 27 input through the second diode 111b, the comparator 131 outputs the output signal Sout of the comparator 131 for determining whether the discharge control can be performed normally. Also based on the gate voltage Vge of each lower arm switch SWL input through the first diode 111a, the comparator 131 outputs the output signal Sout of the comparator 131 for determining whether the three-phase short circuit control can be performed normally. The output signal Sout from the comparator 131 is input to the microcomputer 60 via the modulation unit 132, the output insulative transmission unit 112, and the demodulation unit 113.

This configuration allows the signal regarding the gate voltage Vgs of the discharge switch 27 and the signal regarding the gate voltage Vge of the lower arm switch SWL to be delivered to the microcomputer 60 through the common operation detection unit 130. Thus, compared with a configuration in which the signal regarding the gate voltage Vgs of the discharge switch 27 and the signal regarding the gate voltage Vge of the lower arm switch SWL are delivered to the microcomputer 60 through individual operation detection units, the above configuration can reduce the power consumption of the operation detection unit 130 and the part of the output insulative transmission unit 112 in the high voltage area, contributing to a reduction in the output current from the emergency power supply 90. This results in a reduction in the amount of heat produced by the emergency power supply 90.

Since the operation detection unit 130 is shared, the operation detection unit 130, in one period of time, delivers the output signal Sout of the comparator 131 for determining whether the discharge control can be performed normally to the microcomputer 60 through the modulation unit 132, the output insulative transmission unit 112, and the demodulation unit 113, and in another period of time, delivers the output signal Sout of the comparator 131 for determining whether the three-phase short circuit control can be performed normally to the microcomputer 60 through the modulation unit 132, the output insulative transmission unit 112, and the demodulation unit 113. The configuration described above can appropriately deliver the signal for determining whether each control can be performed normally to the microcomputer 60 as well as reduce the amount of heat produced by the emergency power supply 90.

In the present embodiment, when the emergency driving voltage Veps is generated, the terminal voltage of the smoothing capacitor 24 differs greatly from the output voltage of the emergency power supply 90. In this case, in order to prevent the emergency power supply 90 from abnormally overheating, the output current from the emergency power supply 90 is to be reduced. For this reason, the sharing of the operation detection unit 130 and the output insulative transmission unit 112 is highly advantageous in view of the reduction in the output current from the emergency power supply 90.

In the operation detection unit 130, the output signal Sout from the comparator 131 for determining whether each of the three-phase short circuit control and the discharge control can be performed normally is converted by the modulation unit 132 into a pulse signal and then output. This may shorten the on duration of the part of the output insulative transmission unit 112 in the high voltage area, reducing the power consumption of the operation detection unit 130 and the part of the output insulative transmission unit 112 in the high voltage area. This results in a reduction in the heat produced by the emergency power supply 90. Furthermore, as described above, since the output current from the emergency power supply 90 is to be reduced, it is highly advantageous to deliver signals to the microcomputer 60 in the form of pulse signals.

The second regulatory diodes 95 are provided to prevent the backflow of a current from the gate of each lower arm switch SWL. One second regulatory diode 95 may have an open-circuit fault. In this case, without any other second regulatory diode 95 provided, the output power of the emergency power supply 90 would not be supplied to the gate of the lower arm switch SWL during the ASC checking. In other words, although the voltage input to the non-inverting input terminal of the comparator 131 is the emergency driving voltage Veps, no electric power is supplied to the gate of the lower arm switch SWL, actually. Thus, even in the event of an abnormality in which the lower arm switch SWL cannot be in the on state, the microcomputer 60 will erroneously determine that the three-phase short circuit control can be performed normally. To avoid such a situation, in the present embodiment, the parallel-connection body of multiple second regulatory diodes 95 is used to connect the common channel 94 and the gate of the lower arm switch SWL. Thus, even in the event of an open-circuit fault in any one of the second regulatory diodes 95, the current flow channel is ensured between the common channel 94 and the gate of the lower arm switch SWL, preventing the erroneous determination described above.

Modifications of First Embodiment

The determination as to whether the three-phase short circuit control can be performed normally may follow the determination as to whether the discharge control can be performed normally. In other words, prior to the processing of steps S44 and S45 in FIG. 11, the processing of step S24 in FIG. 10 may be performed. In this case, after the period for outputting the output signal Sout of the comparator 131 for determining whether the discharge control can be performed normally, the operation detection unit 130 may output the output signal Sout of the comparator 131 for determining whether the three-phase short circuit control can be performed normally.

The specified voltage Vα may not be the starting voltage of the power supply control unit 90b, but may be set at a voltage higher than the starting voltage and lower than the output voltage of the high voltage power source 30.

The signal used to determine whether the discharge control can be performed normally may not be the gate voltage of the discharge switch 27. For example, the signal may be the drive command SgG output from the pulse command generation unit 122 or the voltage at the connection point between the discharge resistor 26 and the drain of the discharge switch 27.

The signal used to determine whether the three-phase short circuit control can be performed normally may not be the voltage supplied through the first diode 111a (i.e., the gate voltage of each lower arm switch SWL). For example, the signal may be the voltage between the collector and the emitter of the lower arm switch SWL.

In the configuration shown in FIG. 4, the components for performing the discharge control on the smoothing capacitor 24 may not be included in the control circuit 50. In the configuration shown in FIG. 4, the components for performing the three-phase short circuit control may not be included in the control circuit 50.

In FIG. 5, the abnormality notification signal FMCU for stopping the isolated power supply 80 may be generated from any one of the first determination signal Sg1 and the second determination signal Sg2.

The monitor unit 85 may be supplied with a voltage other than the output voltage VB of the input circuit 61. The voltage supplied may be any power supply voltage other than the output voltage of the first to third low voltage power supply circuits 63 to 65.

Each of the upper and lower arm isolated power supplies may be provided with a separate control unit included in the isolated power supply 80. In this case, the undervoltage lockout function may stop both the control unit for the upper arm isolated power supply and the control unit for the lower arm isolated power supply to stop the isolated power supply 80.

The three-phase short circuit control may be achieved by turning on the three-phase upper arm switches SWH and turning off the three-phase lower arm switches SWL. In this case, each of the three-phase upper arm switches SWH may be provided with a separate emergency power supply 90.

In the event of a coupler abnormality in which the parts of the upper and lower arm insulative transmission units 81b, 82b included in the upper and lower arm drivers 81, 82 in the low voltage area are not supplied with the first voltage V1r of the first low voltage power supply circuit 63, switching commands from the microcomputer 60 cannot be delivered to the upper and lower arm drive units 81a, 82a. This case results in a shutdown state. To overcome the problem, the configuration described below may be used.

The part of the lower arm insulative transmission unit 82b in the low voltage area is supplied with electric power from a power supply circuit different from the first low voltage power supply circuit 63 (hereinafter, the different power supply circuit). The different power supply circuit may be, for example, a power source that causes no dependent failure when an abnormality has occurred in the first low voltage power supply circuit 63. Specifically, for example, the power source may be the fifth power supply circuit that lowers the output voltage Vm from the intermediate power supply circuit 62 to generate a fifth voltage V5r (e.g., 5 V).

In this configuration, when the output voltage of the different power supply circuit decreases, the isolated power supply 80 may be stopped, and the high voltage ASC command unit 91 may turn on the abnormality switch 93. Specifically, for example, the abnormality detection circuit 87a in the power supply shutoff unit 87 may detect the output voltage of the different power supply circuit, and turn on the switch 87b when the detected output voltage decreases. The configuration described above allows three-phase short circuit control even in the event of a coupler abnormality.

The drive command SgG output from the pulse command generation unit 122 may not be the one shown in FIG. 8. For example, after receiving a discharge command CmdAD, the pulse command generation unit 122 may output a drive command SgG including one or two on-pulse commands during the total pulse duration Tdis. For a drive command SgG including one on-pulse command, the criterion (C) is unnecessary.

The drive command SgG may not include an on-pulse command. The drive command SgG may be always a turning-on command for the period in which the discharge command CmdAD is input.

The verification described for step S24 in FIG. 10 and the verification described for step S45 in FIG. 11 may be performed when, for example, the vehicle is stopped after the start of regular control during one trip. These verifications may be performed multiple times during one trip.

In the case that the discharge resistor 26 has an adequate thermal design margin, the criterion (B) may be deleted.

Second Embodiment

Figure 15:
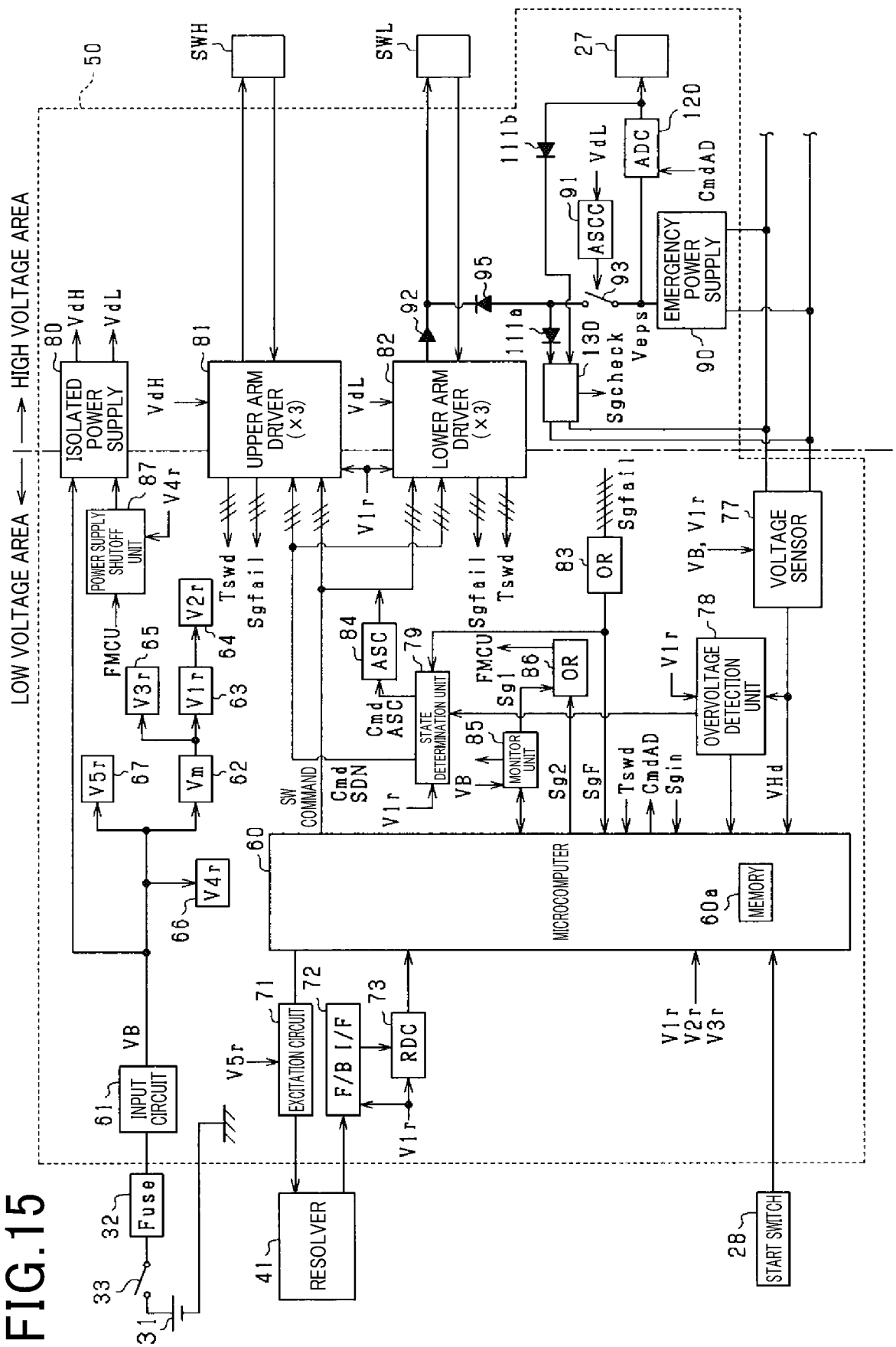
FIG. 15 is a diagram illustrating a control circuit and its surroundings according to a second embodiment.

A second embodiment will now be described with reference to the drawings by focusing on differences from the first embodiment. In the present embodiment, as shown in FIG. 15, the control circuit 50 includes modified components in the high voltage area. For convenience, the same components in FIG. 15 as already illustrated in FIG. 2 are designated by the same reference numerals.

The operation detection unit 130 receives the terminal voltage of the smoothing capacitor 24. Specifically, the operation detection unit 130 receives the terminal voltage of the smoothing capacitor 24 lowered by a voltage converting unit.

In the present embodiment, when a voltage used to determine whether the discharge control can be performed normally is input from the second diode 111b to the operation detection unit 130, the voltage information is not immediately delivered to the microcomputer 60 but latched by the operation detection unit 130. In addition, when a voltage used to determine whether the three-phase short circuit control can be performed normally is input from the first diode 111a to the operation detection unit 130, the voltage information is not immediately delivered to the microcomputer 60 but latched by the operation detection unit 130. After the processing of step S48 in FIG. 11 starts the discharge of the smoothing capacitor 24, the operation detection unit 130 delivers the latched voltage signals to the microcomputer 60 through the output insulative transmission unit 112 and the demodulation unit 113. Then, the microcomputer 60 uses the received voltage signals, or the demodulated signals Sgin, to determine whether each of the three-phase short circuit control and the discharge control can be performed normally.

The period for delivering the latched signals will now be described with reference to FIG. 16. FIG. 16(k) shows changes in the state of function monitoring for three-phase short circuit control and discharge control by the operation detection unit 130. FIG. 16(L) shows changes in the state of notification of the function monitoring by the operation detection unit 130. FIGS. 16(a) to 16(j) correspond to FIGS. 13(a) to 13(j), which have been described previously. Times t1, t2, . . . , t9 in FIG. 16 correspond to times t1, t2, . . . , t9 in FIG. 13.

At times t2 to t3, a voltage signal used to determine whether the input-side insulated transfer unit 110, the input interface unit 121, the pulse command generation unit 122, and the drive circuit 123 are normal is input from the second diode 111b to the operation detection unit 130, and the operation detection unit 130 latches the input voltage signal. The latch may be performed by time 3. At times t7 to t8, a voltage signal used to determine whether the three-phase short circuit control can be performed normally is input from the first diode 111a to the operation detection unit 130, and the operation detection unit 130 latches the input voltage signal. The latch may be performed by time t8.

At time t9, the execution of discharge control starts to reduce the terminal voltage VH of the smoothing capacitor 24. Then, at time t10, the operation detection unit 130 determines that the terminal voltage VH of the smoothing capacitor 24 has reached a predetermined value lower than the output voltage of the high voltage power source 30. The predetermined value is determined as a value that can, for example, prevent the emergency power supply 90 from abnormally overheating. In response to the determination that the terminal voltage VH of the smoothing capacitor 24 has reached the predetermined value, the discharge control is stopped at time t11, and the terminal voltage VH of the smoothing capacitor 24 stops decreasing. Before the elapse of the notification period from time t10 to time t14, the operation detection unit 130 sequentially delivers the latched voltage signal from the second diode 111b and the latched voltage signal from the first diode 111a to the microcomputer 60 in the form of pulse signals. At time t12, the discharge control restarts, and the terminal voltage VH of the smoothing capacitor 24 starts to decrease.

Figure 16:
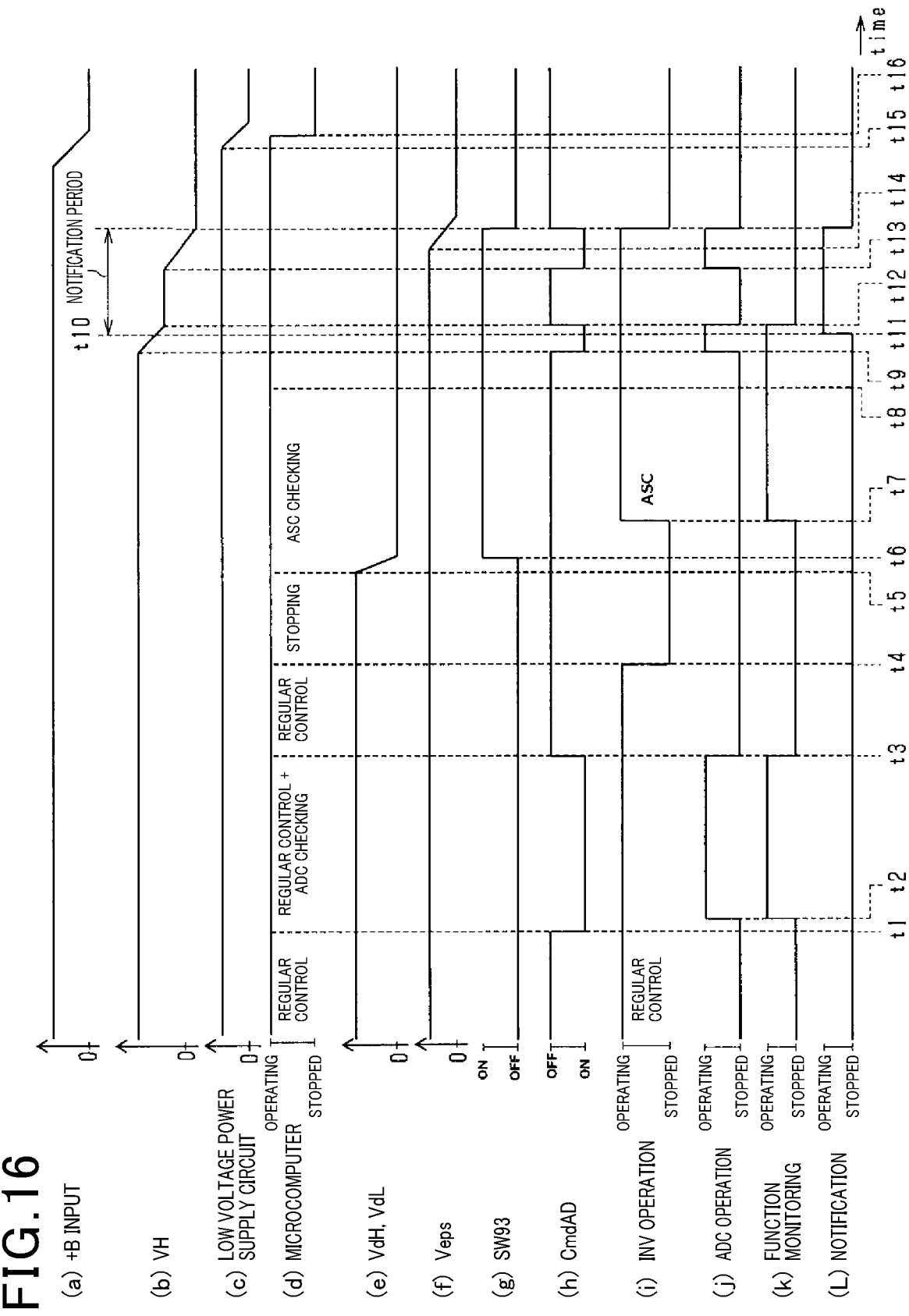
FIG. 16 is a timing chart showing an example of determination as to whether the discharge control and the three-phase short circuit control can be performed normally.

Times t14, t15, and t16 in FIG. 16 correspond to times t11, t12, and t13 in FIG. 13, which have been described previously. At times t8 to t14, it is not verified whether each of the three-phase short circuit control and the discharge control can be performed normally, and also the voltage signal from the second diode 111b and the voltage signal from the first diode 111a are not latched.

Under the condition that the terminal voltage VH of the smoothing capacitor 24 has reached the predetermined value lower than the output voltage of the high voltage power source 30, the operation detection unit 130 delivers the voltage signals to the microcomputer 60 via the output insulative transmission unit 112 and the demodulation unit 113. This is intended to reduce the heat produced by the emergency power supply 90. In other words, when the emergency driving voltage Veps is generated, the amount of heat produced by the emergency power supply 90 is reduced by narrowing the gap between the terminal voltage of the smoothing capacitor 24 and the output voltage of the emergency power supply 90. This can prevent the emergency power supply 90 from abnormally overheating.

Third Embodiment

Figure 17:
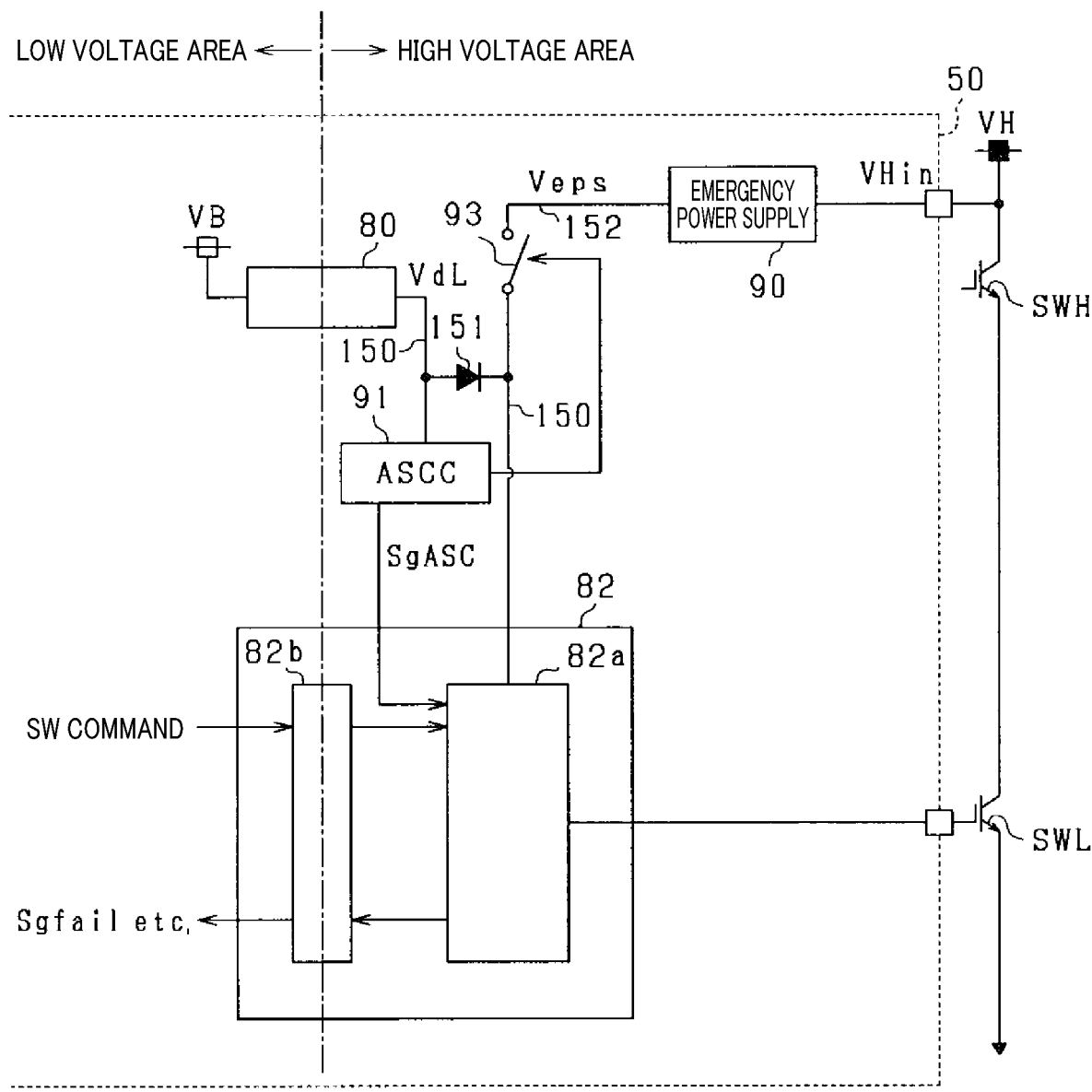
FIG. 17 is a diagram illustrating upper and lower arm drivers and their surroundings according to a third embodiment.

A third embodiment will now be described with reference to the drawings by focusing on differences from the first embodiment. In the present embodiment, as shown in FIG. 17, the control circuit 50 includes modified components in the high voltage area. For convenience, the same components in FIG. 17 as already illustrated in FIG. 3 are designated by the same reference numerals.

The control circuit 50 includes a regular power supply channel 150, a regular diode 151, an emergency power supply channel 152, and an abnormality switch 93. The regular power supply channel 150 connects the output terminal of the isolated power supply 80 and the lower arm drive unit 82a and supplies the lower arm driving voltage VdL to the lower arm drive unit 82a. The regular diode 151 is provided at a position midway in the regular power supply channel 150 with its anode connected to the output terminal of the isolated power supply 80.

The part of the regular power supply channel 150 extending from the regular diode 151 toward the lower arm drive unit 82a and the output terminal of the emergency power supply 90 are connected together by the emergency power supply channel 152. The abnormality switch 93 is provided in the emergency power supply channel 152. The emergency power supply channel 152 supplies the emergency driving voltage Veps to the lower arm drive unit 82a.

The high voltage ASC command unit 91 is supplied with the lower arm driving voltage VdL from the isolated power supply 80 through the regular power supply channel 150. The high voltage ASC command unit 91 outputs a high voltage ASC command SgASC to the lower arm drive unit 82a.

Figure 18:
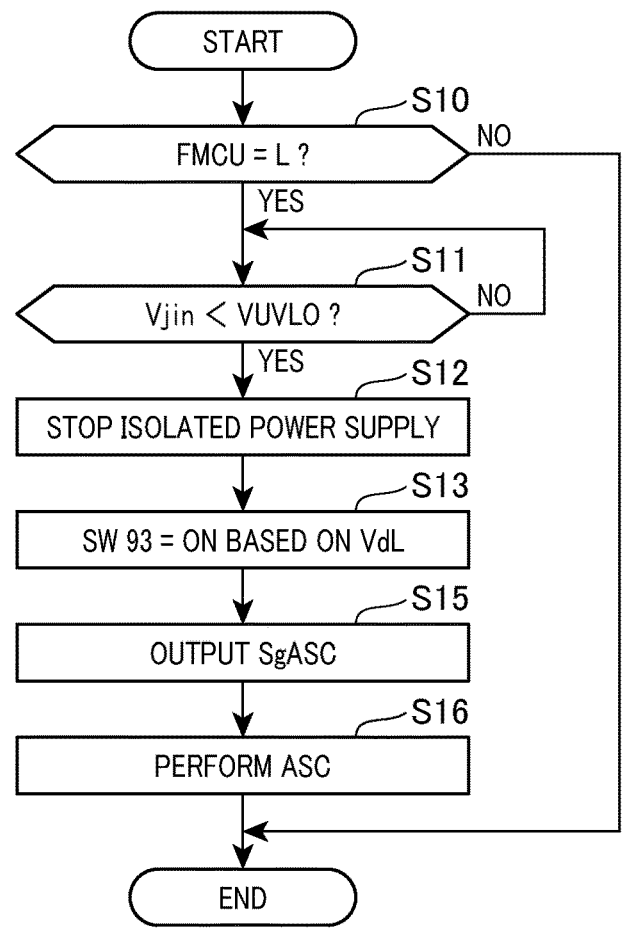
FIG. 18 is a flowchart showing the procedure of the three-phase short circuit control.

Referring to FIG. 18, the three-phase short circuit control performed when an abnormality has occurred in the control circuit 50 will now be described. For convenience, the same steps in FIG. 18 as already shown in FIG. 6 are designated by the same reference numerals.

The processing of step S13 starts the supply of the emergency driving voltage Veps from the emergency power supply 90 to the three-phase lower arm drive units 82a.

Then, in step S15, the high voltage ASC command unit 91 outputs a high voltage ASC command SgASC to the three-phase lower arm drive units 82a. Thus, in step S16, the lower arm drive unit 82a in each phase brings the lower arm switch SWL into the on state. In this manner, the three-phase short circuit control is performed.

According to the present embodiment described above, the same effects as in the first embodiment can be achieved.

Other Embodiments

Each of the above embodiments may be modified as described below.

Figure 19:
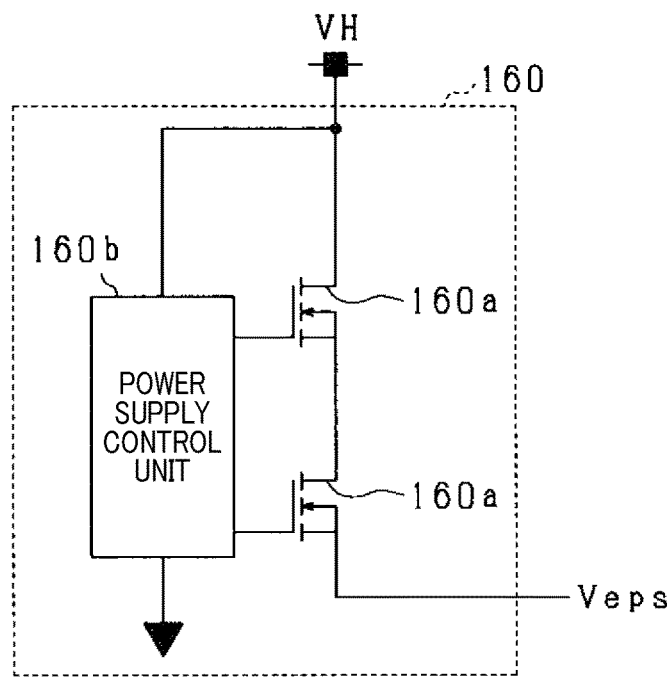
FIG. 19 is a diagram illustrating an emergency power supply according to another embodiment.

The emergency power supply may not have a single-switch configuration including the one control switch 90a, but may be, for example, an emergency power supply 160 having a double-switch configuration including two control switches 160a as shown in FIG. 19. The gate voltage of each control switch 160a is controlled by a power supply control unit 160b. The configuration shown in FIG. 19 is used, for example, when a control switch is assumed to produce a large amount of heat.

The emergency power supply may not be a linear power supply but may be, for example, a switching power supply (specifically, an isolated or non-isolated switching power supply) or a power supply including a Zener diode. For an emergency power supply that is a switching power supply, for example, when the voltage input to the UVLO terminal of the power supply control unit included in the emergency power supply increases and reaches the specified voltage Vα, the emergency driving voltage Veps of the emergency power supply starts to be controlled to a target voltage. For a configuration in which an input voltage is divided through resistors and input to the UVLO terminal, for example, the input voltage at the UVLO threshold (the voltage input to the voltage dividers) corresponds to the specified voltage Vα.

For a linear power supply controlled by a controller such as a power supply IC, a configuration in which an input voltage is divided through resistors and input to the UVLO terminal may be used similarly to the switching power supply. In this case, for example, the input voltage at the UVLO threshold (the voltage input to the voltage dividers) corresponds to the specified voltage Vα.

In FIG. 4, the gate of each lower arm switch SWL may be provided with a single, not multiple, second regulatory diode 95.

The emergency power supply 90 may be started after the input voltage of the power supply control unit 90b increased by the electricity supplied from the high voltage power source 30 reaches the output voltage of the high voltage power source 30.

The electric load electrically connected to the high voltage power source 30 may not be the inverter 15.

The discharge switch 27 may not be an N-channel MOSFET.

Each driver 81, 82 may be a driver placed only in the high voltage area without spanning the boundary between the low voltage area and the high voltage area.

In the configuration already illustrated in FIG. 1, a boost converter may be provided between the smoothing capacitor 24 and each shutoff switch 23a, 23b.

Each of the switches included in the inverter may not be an IGBT but may be, for example, an N-channel MOSFET incorporating a body diode.

The switch for each arm in each phase included in the inverter may be a set of two or more switches connected in parallel with each other. In this case, the combination of the switches connected in parallel with each other may be, for example, a combination of a SiC switching element and a Si switching element or a combination of an IGBT and a MOSFET.

The control amount of the rotating electric machine may not be torque but may be, for example, the rotational speed of the rotor of the rotating electric machine.

The rotating electric machine may have three or more phases. The rotating electric machine may not be a permanent-magnet synchronous motor but may be, for example, a wound-field synchronous motor. The rotating electric machine may not be a synchronous motor but may be, for example, an induction machine. Furthermore, the rotating electric machine may not be a vehicle main motor but may be used for other purposes, for example, as an electric motor included in an electric power steering system or an air-conditioning electric compressor.

The control unit and its techniques described in the present disclosure may be implemented by a special purpose computer including memory and a processor programmed to execute at least one function embodied by a computer program. Alternatively, the control unit and its technique described in the present disclosure may be implemented by a special purpose computer including a processor formed of at least one dedicated hardware logic circuit. Alternatively, the control unit and its technique described in the present disclosure may be implemented by at least one special purpose computer including a combination of memory and a processor programmed to execute at least one function and a processor formed of at least one hardware logic circuit. The computer programs may be stored in a non-transitory, tangible computer readable storage medium as instructions executed by a computer.

Although the present disclosure has been described in accordance with the embodiments, it will be understood that this disclosure is not limited to the embodiments or the structures. This disclosure encompasses various modifications and alterations falling within the range of equivalence. In addition, various combinations and forms as well as other combinations and forms with one, more than one, or less than one element added thereto also fall within the scope and spirit of the present disclosure.

What is claimed is:

1. A power converter control circuit for a system including a power storage unit, an electric load, and a power converter electrically connected to the electric load, the power converter control circuit comprising:

an abnormality determination unit configured to determine whether an abnormality has occurred in the system;

an emergency power supply configured to generate power based on electricity supplied from the power storage unit; and a protective control unit configured to, in response to the abnormality determination unit determining that an abnormality has occurred, perform protective control for the system by using the power generated by the emergency power supply, wherein the emergency power supply includes a power supply control unit for controlling the emergency power supply and configured to be operable based on electricity supplied from the power storage unit, during a period from when an input voltage to the power supply control unit starts increasing based on electricity supplied from the power storage unit to when the input voltage reaches a voltage of the power storage unit, the power supply control unit starts the emergency power supply in response to the input voltage reaching a specified voltage, the emergency power supply includes a voltage adjustment unit configured to adjust a drop in voltage supplied from the power storage unit, the power supply control unit operates the voltage adjustment unit to adjust a voltage drop, thereby controlling an output voltage from the emergency power supply, the electric load is a multiphase rotating electric machine, the power converter includes switches for upper and lower arms electrically connected to a winding in each phase of the rotating electric machine, the system includes electrical channels connected to the power storage unit and connecting the power converter and a power source, and includes a series-connection body of a discharge resistor and a discharge switch connected in parallel with the power storage unit, the protective control unit is capable of performing, as the protective control, short circuit control for bringing an on switch, which is one of the switches and for one arm of the upper and lower arms, into an on state and for bringing an off switch, which is another one of the switches and the other arm of the upper and lower arms, into an off state, and discharge control being drive control for the discharge switch for discharging the power storage unit, the power converter control circuit comprises:

a protection determination unit configured to determine whether the short circuit control can be normally performed by the protective control unit and whether the discharge control can be normally performed by the protective control unit; and a notification unit configured to be operable based on power supplied from the emergency power supply and configured to deliver, to the protection determination unit, a detection result of a state signal about the on switch being instructed to be on, the notification unit is used for both delivery of a detection result of a state signal about the on switch and delivery of a detection result of a signal regarding drive of the discharge switch, and delivers, to the protection determination unit, the detection result of the signal regarding the drive of the discharge switch during a period not overlapping a notification period for the delivery of the detection result of the state signal about the on switch, and the protection determination unit, based on the detection result of the state signal about the on switch, the result delivered from the notification unit, determines whether the short circuit control is capable of being performed normally, and based on the detection result of the signal regarding the drive of the discharge switch, the result delivered from the notification unit, determines whether the discharge control is capable of being performed normally.

2. The power converter control circuit according to claim 1, further comprising:

a switch command generation unit configured to generate and output a switching command for controlling drive of the rotating electric machine; and switch drive units configured to drive the switches for the upper and lower arms based on the switching command, wherein the emergency power supply is capable of supplying electric power to a gate of the on switch without passing the electric power through the corresponding switch drive unit.

3. The power converter control circuit according to claim 1, wherein the specified voltage is a starting voltage of the power supply control unit.

4. The power converter control circuit according to claim 1, wherein the emergency power supply includes a voltage adjustment unit configured to adjust a drop in voltage supplied from the power storage unit, and the power supply control unit is configured to operate the voltage adjustment unit to adjust a voltage drop, thereby controlling an output voltage from the emergency power supply.

5. The power converter control circuit according to claim 1, wherein the notification unit delivers, as pulse signals, the detection result of the signal regarding the drive of the discharge switch and the detection result of the state signal about the on switch to the protection determination unit.

6. The power converter control circuit according to claim 1, further comprising:

a switch command generation unit configured to generate and output a switching command for controlling the drive of the rotating electric machine;

switch drive units configured to drive the switches for the upper and lower arms based on the switching command;

a charging channel connecting the emergency power supply and a gate of the on switch without being routed through the switch drive unit; and a parallel-connection body of a plurality of diodes, the parallel-connection body provided in the charging channel and having an anode facing the emergency power supply.

7. The power converter control circuit according to claim 1, wherein the protection determination unit is configured to determine whether the protective control can be normally performed by the protective control unit;

the notification unit is configured to deliver a signal for determining whether the protective control is capable of being performed normally to the protection determination unit;

provided that an input voltage of the emergency power supply has reached a predetermined value lower than a voltage of the power storage unit, the notification unit delivers the signal for determining whether the protective control is capable of being performed normally to the protection determination unit; and the protection determination unit, based on the signal delivered from the notification unit, determines whether the protective control is capable of being performed normally.

* * * * *